US010432329B2

(12) United States Patent
Tsujita

(10) Patent No.: US 10,432,329 B2
(45) Date of Patent: Oct. 1, 2019

(54) TRANSMITTER, RECEIVER, AND TRANSMITTING AND RECEIVING SYSTEM

(71) Applicant: PACIFIC INDUSTRIAL CO., LTD., Ogaki-shi, Gifu-ken (JP)

(72) Inventor: Yasuhisa Tsujita, Motosu (JP)

(73) Assignee: PACIFIC INDUSTRIAL CO., LTD., Ogaki-Shi, Gifu-Ken (JP)

(*) Notice: Subject to any disclaimer, the term of this patent is extended or adjusted under 35 U.S.C. 154(b) by 0 days.

(21) Appl. No.: 15/758,594

(22) PCT Filed: Mar. 29, 2017

(86) PCT No.: PCT/JP2017/013114
§ 371 (c)(1),
(2) Date: Mar. 8, 2018

(87) PCT Pub. No.: WO2018/131177
PCT Pub. Date: Jul. 19, 2018

(65) Prior Publication Data
US 2019/0036625 A1    Jan. 31, 2019

(30) Foreign Application Priority Data
Jan. 11, 2017 (JP) .................. 2017-002932

(51) Int. Cl.
B60C 23/04    (2006.01)
H04B 17/20    (2015.01)
(Continued)

(52) U.S. Cl.
CPC ......... H04B 17/20 (2015.01); B60C 23/0418 (2013.01); B60C 23/0462 (2013.01);
(Continued)

(58) Field of Classification Search
CPC ............ B60C 23/0408; B60C 23/0462; B60C 23/0481
See application file for complete search history.

(56) References Cited

U.S. PATENT DOCUMENTS

2002/0170013 A1    11/2002  Bolourchi et al.
2007/0090936 A1     4/2007  Nornes
(Continued)

FOREIGN PATENT DOCUMENTS

JP    2004531137 A    10/2004
JP     200662533 A     3/2006
(Continued)

OTHER PUBLICATIONS

Office Action and English Translation of Office Action, issued in Korean Patent Application No. 10-2018-7007441, dated Feb. 7, 2019; 11 pages.
(Continued)

Primary Examiner — Janice N Tieu
(74) Attorney, Agent, or Firm — Cantor Colburn LLP

(57) ABSTRACT

A transmitter includes a transmitter control section, which generates transmission data to be transmitted to a receiver. The transmission data contains variable data and verification data. The verification data is data for causing a verifying section of the receiver to verify an ID code registered in the transmitter against an ID code registered in the receiver. The transmitter control section is capable of switching between a first state and a second state. The first state is a state in which fixed data representing identification information is transmitted as the verification data. The second state is a state in which computation data computed from the variable data and the fixed data is transmitted as the verification data.

12 Claims, 8 Drawing Sheets

(51) Int. Cl.
*H04L 1/00* (2006.01)
*H04B 1/16* (2006.01)
*H04B 1/04* (2006.01)
*G06K 19/07* (2006.01)
*G06K 19/077* (2006.01)

(52) U.S. Cl.
CPC ........... *G06K 19/07* (2013.01); *G06K 19/077* (2013.01); *H04B 1/04* (2013.01); *H04B 1/16* (2013.01); *H04L 1/0041* (2013.01); *H04L 1/0045* (2013.01); *H04L 1/0057* (2013.01); *H04L 1/0061* (2013.01); *Y02D 70/00* (2018.01)

(56) References Cited

U.S. PATENT DOCUMENTS

| | | | |
|---|---|---|---|
| 2008/0204217 A1* | 8/2008 | Costello | B60C 23/0408 340/447 |
| 2011/0043353 A1* | 2/2011 | Wagner | B60C 23/0416 340/442 |
| 2013/0049944 A1* | 2/2013 | Kosugi | B60C 23/0462 340/447 |

FOREIGN PATENT DOCUMENTS

| | | |
|---|---|---|
| JP | 2006062533 A | 3/2006 |
| JP | 2006306202 A | 11/2006 |
| JP | 2007112434 A | 5/2007 |
| JP | 2008024180 A | 2/2008 |
| JP | 201346147 A | 3/2013 |
| JP | 201346148 A | 3/2013 |
| JP | 2013046147 A | 3/2013 |
| KR | 1019940017381 A | 7/1994 |

OTHER PUBLICATIONS

Office Action and English Translation of Application, issued in Japanese Patent Application No. 2017002932, dated May 1, 2019; 6 pages.

* cited by examiner

Fig.3A

| Preamble | Identifying Code | ID Code | Fixed Bit | Pressure Data | Temperature Data | Status Code | Error Detection Code | Stop Bit |

Fig.3B

| Preamble | Identifying Code | Pressure Data | Temperature Data | Status Code | Error Detection Code | Stop Bit |

Fig.4A

| Contents | Number of Bits | Data String | |
|---|---|---|---|
| | | Hexadecimal | Binary |
| Preamble | 16 | - | - |
| Identifying Code | 2 | - | - |
| ID1 | 8 | FE | 11111110 |
| ID2 | 8 | 02 | 00000010 |
| ID3 | 8 | 1A | 00011010 |
| ID4 | 8 | 6B | 01101011 |
| Fixed Bit | 4 | 06 | 0110 |
| Pressure 1 | 4 | 07 | 0111 |
| Pressure 2 | 8 | B6 | 10110110 |
| Temperature | 8 | CD | 11001101 |
| Status 1 | 8 | 01 | 00000001 |
| Status 2 | 8 | 87 | 10000111 |
| Checksum | 8 | 17 | 00010111 |
| Stop Bit | 2 | - | - |
| Total | 100 | | |

Fig.4B

| Contents | Number of Bits | Data String | |
|---|---|---|---|
| | | Hexadecimal | Binary |
| Preamble | 16 | - | - |
| Identifying Code | 2 | - | - |
| Pressure 1 | 4 | 07 | 0111 |
| Pressure 2 | 8 | B6 | 10110110 |
| Temperature | 8 | CD | 11001101 |
| Status 1 | 8 | 01 | 00000001 |
| Status 2 | 8 | 87 | 10000111 |
| Checksum | 8 | 17 | 00010111 |
| Stop Bit | 2 | - | - |
| Total | 64 | | |

Fig.5

| Contents | Number of Bits | Data String | | | | | | | |
|---|---|---|---|---|---|---|---|---|---|
| | | FR | | FL | | RR | | RL | |
| | | Hexadecimal | Binary | Hexadecimal | Binary | Hexadecimal | Binary | Hexadecimal | Binary |
| ID1 | 8 | FE | 11111110 | FE | 11111110 | FE | 11111110 | FE | 11111110 |
| ID2 | 8 | 02 | 00000010 | 02 | 00000010 | 02 | 00000010 | 02 | 00000010 |
| ID3 | 8 | 1A | 00011010 | 1A | 00011010 | 1A | 00011010 | 1A | 00011010 |
| ID4 | 8 | 6B | 01101011 | 55 | 01010101 | 36 | 00110110 | 2A | 00101010 |
| Fixed Bit | 4 | 06 | 0110 | 06 | 0110 | 06 | 0110 | 06 | 0110 |

Fig.6

| Contents | Number of Bits | Data String | | | | | | | |
|---|---|---|---|---|---|---|---|---|---|
| | | FR | | FL | | RR | | RL | |
| | | Hexadecimal | Binary | Hexadecimal | Binary | Hexadecimal | Binary | Hexadecimal | Binary |
| ID1 | 8 | FE | 11111110 | FE | 11111110 | FE | 11111110 | FE | 11111110 |
| ID2 | 8 | 02 | 00000010 | 02 | 00000010 | 02 | 00000010 | 02 | 00000010 |
| ID3 | 8 | 1A | 00011010 | 1A | 00011010 | 1A | 00011010 | 1A | 00011010 |
| ID4 | 8 | 6B | 01101011 | 55 | 01010101 | 36 | 00110110 | 2A | 00101010 |
| Fixed Bit | 4 | 06 | 0110 | 06 | 0110 | 06 | 0110 | 06 | 0110 |
| Pressure 1 | 4 | 07 | 0111 | 07 | 0111 | 07 | 0111 | 07 | 0111 |
| Pressure 2 | 8 | B6 | 10110110 | B6 | 10110110 | B6 | 10110110 | B6 | 10110110 |
| Temperature | 8 | CD | 11001101 | CD | 11001101 | CD | 11001101 | CD | 11001101 |
| Status 1 | 8 | 01 | 00000001 | 01 | 00000001 | 01 | 00000001 | 01 | 00000001 |
| Status 2 | 8 | 87 | 10000111 | 87 | 10000111 | 87 | 10000111 | 87 | 10000111 |
| Received Checksum | 8 | 17 | 00010111 | 17 | 00010111 | 17 | 00010111 | 17 | 00010111 |
| Calculated Checksum | 8 | 17 | 00010111 | 29 | 00101001 | 4A | 01001010 | 56 | 01010110 |
| Check Matching of Checksum | | ○ | | × | | × | | × | |

01000011

| Contents | Number of Bits | Data String (Before Shuffling ID) | | Data String (After Shuffling ID) | |
|---|---|---|---|---|---|
| | | Hexadecimal | Binary | Hexadecimal | Binary |
| Preamble | 16 | - | - | - | - |
| Identifying Code | 2 | - | - | - | - |
| ID1 | 8 | FE | 11111110 | FE | 11111110 |
| ID2 | 8 | 02 | 00000010 | 02 | 00000010 |
| ID3 | 8 | 1A | 00011010 | A1 | 10100001 |
| ID4 | 8 | 6B | 01101011 | B6 | 10110110 |
| Shuffling Pattern | 4 | 0C | 1100 | 0C | 1100 |
| Pressure 1 | 4 | 07 | 0111 | 07 | 0111 |
| Pressure 2 | 8 | B6 | 10110110 | B6 | 10110110 |
| Temperature | 8 | CD | 11001101 | CD | 11001101 |
| Status 1 | 8 | 01 | 00000001 | 01 | 00000001 |
| Status 2 | 8 | 87 | 10000111 | 87 | 10000111 |
| Checksum | 8 | B7 | 10110111 | D1 | 11010001 |
| Stop Bit | 2 | - | - | - | - |
| Total | 100 | | | | |

Fig.9

| Contents | Number of Bits | Data String ||||||||
|---|---|---|---|---|---|---|---|---|---|
| | | FR || FL || RR || RL ||
| | | Hexadecimal | Binary | Hexadecimal | Binary | Hexadecimal | Binary | Hexadecimal | Binary |
| ID1 | 8 | FE | 11111110 | FE | 11111110 | FE | 11111110 | FE | 11111110 |
| ID2 | 8 | 02 | 00000010 | 02 | 00000010 | 02 | 00000010 | 43 | 01000011 |
| ID3 | 8 | A1 | 10100001 | A1 | 10100001 | A1 | 10100001 | A1 | 10100001 |
| ID4 | 8 | B6 | 10110110 | 55 | 01010101 | 63 | 01100011 | A2 | 10100010 |
| Shuffling Pattern | 4 | 0C | 1100 | 0C | 1100 | 0C | 1100 | 0C | 1100 |
| Pressure 1 | 4 | 07 | 0111 | 07 | 0111 | 07 | 0111 | 07 | 0111 |
| Pressure 2 | 8 | B6 | 10110110 | B6 | 10110110 | B6 | 10110110 | B6 | 10110110 |
| Temperature | 8 | CD | 11001101 | CD | 11001101 | CD | 11001101 | CD | 11001101 |
| Status 1 | 8 | 01 | 00000001 | 01 | 00000001 | 01 | 00000001 | 01 | 00000001 |
| Status 2 | 8 | 87 | 10000111 | 87 | 10000111 | 87 | 10000111 | 87 | 10000111 |
| Received Checksum | 8 | D1 | 11010001 | D1 | 11010001 | D1 | 11010001 | D1 | 11010001 |
| Calculated Checksum | 8 | D1 | 11010001 | 32 | 00110010 | 4 | 00000100 | 84 | 10000100 |
| Check Matching of Checksum | | O | | X | | X | | X | |

TRANSMITTER, RECEIVER, AND TRANSMITTING AND RECEIVING SYSTEM

TECHNICAL FIELD

The present invention relates to a transmitter, a receiver, and a transmitting and receiving system.

BACKGROUND ART

Transmitting and receiving systems that receive transmission data transmitted from a transmitter with a receiver have been known. In such a transmitting and receiving system, the transmitter and the receiver are associated with each other. The receiver recognizes only the transmission data transmitted from the associated transmitter as the transmission data that is intended to be transmitted to the receiver itself. The transmitter includes a transmitter memory, which stores individual identification information, and a power source. The receiver includes a receiver memory, which stores the identification information of the associated transmitter. With this configuration, the same identification information is registered in the receiver and the transmitter associated with the receiver. Since the same identification information is registered, the transmitter and the receiver are associated with each other. The transmitter generates transmission data containing data indicating information intended to be received by the receiver and verification data for allowing the receiver to verify the identification information. The transmitter then transmits the generated transmission data to the receiver. Upon reception of the transmission data, the receiver verifies the identification information of the transmitter that has transmitted the transmission data against the identification information registered in the receiver based on the verification data contained in the transmission data and the identification information stored in the receiver memory. If the identification information registered in the transmitter that has transmitted the transmission data matches the identification information registered in the receiver, the receiver recognizes that the transmission data is the transmission data that is intended to be transmitted to the receiver itself.

One example of the transmitting and receiving system includes, for example, a transmitting and receiving system disclosed in Patent Document 1. The transmitter disclosed in Patent Document 1 computes exclusive OR data by taking the exclusive OR of fixed data, which is the data indicating the identification information, and variable data that may have different values. The transmitter transmits the transmission data with the computed exclusive OR data serving as the verification data. The receiver restores the fixed data and the variable data from the received transmission data by obtaining the exclusive OR of the fixed data stored in the receiver memory and the exclusive OR data. The receiver verifies the fixed data stored in the receiver memory against the fixed data restored from the exclusive OR data.

The transmission of the transmission data consumes electric power of the power source. It is, therefore, necessary to reduce the electric power required for the transmission of data to extend the life of the power source. For this reason, it is desired to reduce the data length of the transmission data transmitted from the transmitter. The transmitter disclosed in Patent Document 1 transmits the transmission data containing the exclusive OR data instead of the fixed data and the variable data. Thus, the data length of the transmission data is shorter than a case in which the fixed data and the variable data are transmitted. However, in the case of taking the exclusive OR of the fixed data and the variable data, the data length of the fixed data is equal to the data length of the exclusive OR data. That is, the data length of the exclusive OR data does not become shorter than that of the fixed data. Thus, in the transmitter disclosed in Patent Document 1, the fixed data hinders reducing the data length of the transmission data.

PRIOR ART DOCUMENT

Patent Document

Patent Document 1: Japanese Laid-Open Patent Publication No. 2013-46148

SUMMARY OF THE INVENTION

Problems that the Invention is to Solve

Accordingly, it is an objective of the present invention to provide a transmitter, a receiver, and a transmitting and receiving system that extend the life of the power source of the transmitter.

Means for Solving the Problems

To achieve the foregoing objective and in accordance with a first aspect of the present invention, a transmitter for transmitting transmission data to a receiver is provided. The transmitter includes a power source, a transmitter memory, which stores identification information, and a data generating section, which generates the transmission data containing variable data that may have a different value and verification data, which causes a verifying section provided in the receiver to verify the identification information stored in the transmitter memory against the identification information registered in the receiver. The data generating section is capable of generating, as the verification data, computation data that is computed from fixed data representing the identification information stored in the transmitter memory and the variable data and that has a shorter data length than the fixed data.

To achieve the foregoing objective and in accordance with a second aspect of the present invention, a receiver for receiving transmission data transmitted from a transmitter is provided. The receiver includes a receiving section, which receives the transmission data, an acquiring section, which acquires, from the transmission data received by the receiving section, verification data contained in the transmission data and variable data that may have a different value, a receiver memory, which stores identification information, and a verifying section, which verifies the identification information registered in the transmitter that has transmitted the transmission data against the identification information stored in the receiver memory based on the verification data and data representing the identification information stored in the receiver memory. If the acquiring section acquires, as the verification data, computation data that is computed from the fixed data representing the identification information registered in the transmitter and the variable data and that has a shorter data length than the fixed data, the verifying section checks whether the computation data matches the data computed from the variable data and the data representing the identification information stored in the receiver memory so as to verify the identification information registered in the transmitter against the identification information registered in the receiver.

To achieve the foregoing objective and in accordance with a third aspect of the present invention, a transmitting and receiving system is provided that includes a transmitter, which transmits transmission data, and a receiver, which receives the transmission data transmitted from the transmitter. The transmitter includes a power source, a transmitter memory, which stores identification information, and a data generating section, which generates the transmission data containing variable data that may have a different value and verification data, which is used for verifying the identification information stored in the transmitter memory against the identification information registered in the receiver. The data generating section is capable of generating, as the verification data, computation data that is computed from fixed data representing the identification information stored in the transmitter memory and the variable data and that has a shorter data length than the fixed data. The receiver includes a receiving section, which receives the transmission data, an acquiring section, which acquires the verification data and the variable data from the transmission data received by the receiving section, a receiver memory, which stores identification information, and a verifying section, which verifies the identification information registered in the transmitter that has transmitted the transmission data against the identification information stored in the receiver memory based on the verification data and data representing the identification information stored in the receiver memory. If the acquiring section acquires the computation data as the verification data, the transmitting and receiving system checks whether the computation data matches data computed from the variable data and data representing the identification information stored in the receiver memory so as to verify the identification information registered in the transmitter against the identification information registered in the receiver.

BRIEF DESCRIPTION OF THE DRAWINGS

FIG. 3A is a diagram illustrating a frame format of first data.

FIG. 3B is a diagram illustrating a frame format of second data.

FIG. 4A is a table illustrating the first data.

FIG. 4B is a table illustrating the second data

FIG. 5 is a table illustrating the ID codes stored in the receiver memory.

FIG. 6 is a table illustrating the variable data contained in the second data and the error detection codes computed from the ID codes stored in the receiver memory.

FIG. 9 is a table illustrating the variable data contained in the second data and the error detection codes computed from the ID codes after the ID codes stored in the receiver memory have been shuffled in accordance with the shuffling pattern.

MODES FOR CARRYING OUT THE INVENTION

First Embodiment

A transmitter, a receiver, and a transmitting and receiving system according to a first embodiment will now be described.

Figure 1:
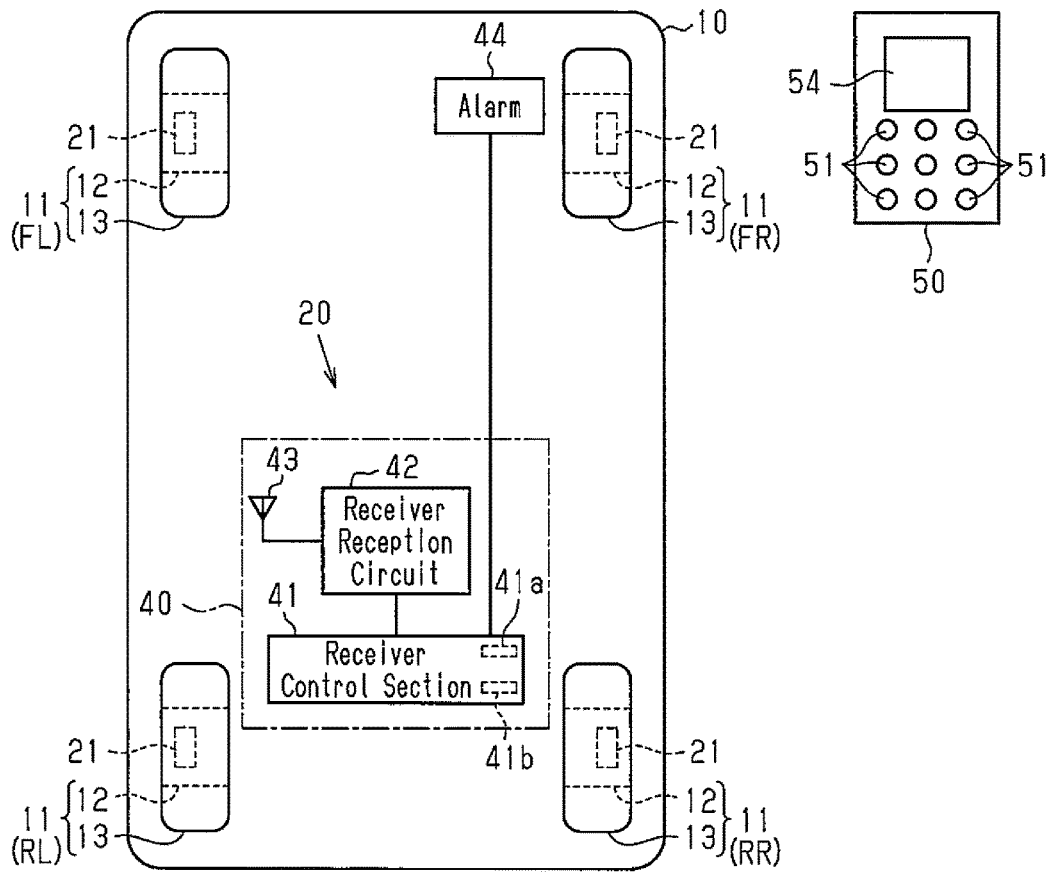
FIG. 1 is a diagram illustrating a tire condition monitoring system and a trigger device according to a first embodiment.

As illustrated in FIG. 1, a transmitting and receiving system, which is a tire condition monitoring system 20 in this embodiment, includes transmitters 21 and a receiver 40. Each transmitter 21 is mounted on one of four wheel assemblies 11 of a vehicle 10. The receiver 40 is mounted on the vehicle 10. Each wheel assembly 11 includes a wheel 12 and a tire 13 mounted on the wheel 12. When necessary, the front right wheel assembly of the wheel assemblies 11 is referred to as FR, the front left wheel assembly is referred to as FL, the rear right wheel assembly is referred to as RR, and the rear left wheel assembly is referred to as RL. Each transmitter 21 may be secured to a tire valve or may be secured to the associated wheel 12 or the associated tire 13.

Each transmitter 21 is mounted on the associated wheel assembly 11 to be located in the internal space of the tire 13. Each transmitter 21 detects the condition (for example, the tire air pressure and the temperature in the tire) of the corresponding tire 13 and wirelessly transmits the transmission data containing the detected information of the tire 13 to the receiver 40. The tire condition monitoring system 20 monitors the condition of the tires 13 by receiving the transmission data transmitted from the transmitters 21 with the receiver 40. The transmitters 21 are vehicle transmitters that transmit data associated with the vehicle 10, and the receiver 40 is a vehicle receiver that receives data associated with the vehicle 10.

Figure 2:
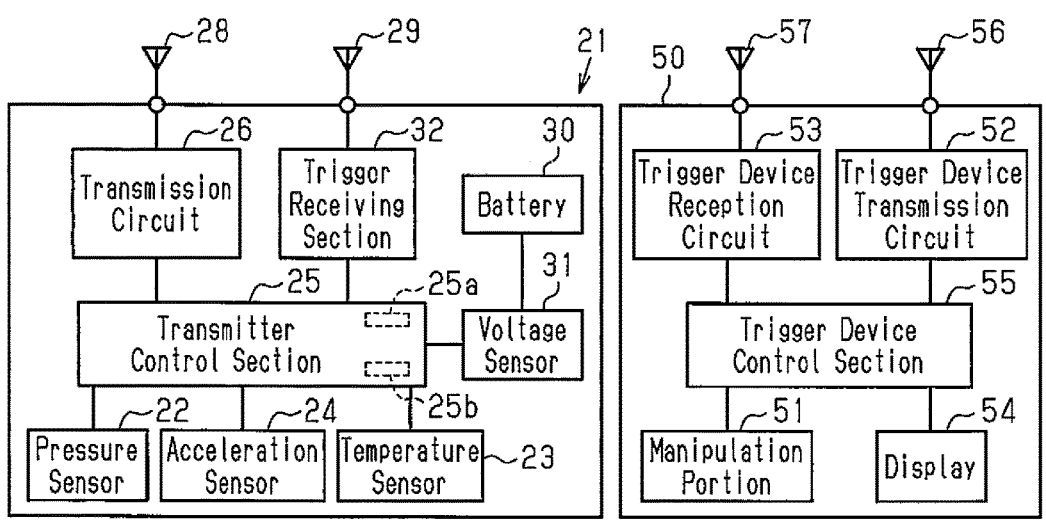
FIG. 2 is a block diagram illustrating the transmitter and the trigger device according to the first embodiment.

As illustrated in FIG. 2, each transmitter 21 includes a pressure sensor 22, a temperature sensor 23, an acceleration sensor 24, a transmitter control section 25, a transmission circuit 26, a trigger receiving section 32, a transmitting antenna 28, a receiving antenna 29, a battery 30, and a voltage sensor 31. The battery 30 serves as the power source of the transmitter 21. The battery 30 may be a storage device such as a primary battery, a rechargeable battery, and a capacitor.

The pressure sensor 22 detects the air pressure of the corresponding tire 13. The pressure sensor 22 outputs the detection result to the transmitter control section 25. The temperature sensor 23 detects the temperature in the corresponding tire 13. The temperature sensor 23 outputs the detection result to the transmitter control section 25. The acceleration sensor 24 is rotated with the associated wheel assembly 11 to detect the acceleration applied to itself. The acceleration sensor 24 outputs the detection result to the transmitter control section 25. The acceleration sensor 24 is mounted to be able to detect the centrifugal acceleration involved in the rotation of the wheel assembly 11. In this case, the detection axis of the acceleration sensor 24 is oriented in a direction in which the centrifugal acceleration acts. The pressure sensor 22, the temperature sensor 23, and the acceleration sensor 24 function as a detecting section. The voltage sensor 31 detects the voltage of the battery 30 (the end-to-end voltage of the battery 30). The voltage sensor 31 outputs the detection result to the transmitter control section 25.

The transmitter control section 25 is, for example, a microcomputer including a CPU 25a and a transmitter memory 25b (such as a RAM and a ROM). The transmitter memory 25b stores an ID code, which is data indicating the identification information specific to each transmitter 21. Thus, the ID code is registered to each transmitter 21. The transmitter memory 25b also stores various programs for controlling the transmitter 21. The programs include a program for switching the state of the transmission data transmitted from the transmitter 21. The transmitter control section 25 includes a timing function. The timing function may be implemented by, for example, a timer or a counter.

The transmitter control section 25 acquires, at each predetermined acquisition interval (for example, several seconds to several tens of seconds), detection results detected by the pressure sensor 22, the temperature sensor 23, the acceleration sensor 24, and the voltage sensor 31 and obtains detection values. The detection values are obtained by analog-to-digital conversion of the outputs from the sensors 22, 23, 24, and 31. The analog-to-digital conversion may be performed in each of the sensors 22, 23, 24, and 31 or may be performed in the transmitter control section 25. That is, each of the sensors 22, 23, 24, and 31 or the transmitter control section 25 includes an analog-to-digital converter. The detection values are the pressure, the temperature, the acceleration, and the voltage. The transmitter control section 25 generates transmission data containing the tire condition (for example, the tire air pressure and the temperature in the tire) and the ID code based on the detection results. The transmission data is the digital data and is a data string of binary numbers or a hexadecimal numbers. The transmitter control section 25 outputs the generated transmission data to the transmission circuit 26. The transmission circuit 26 modulates the transmission data output from the transmitter control section 25. The modulated transmission data is transmitted from the transmitting antenna 28 as a radio signal. The radio signal is a signal containing the transmission data. The radio signal is transmitted as the signal in an RF band (for example, 315 MHz band and 434 MHz band).

The transmitter control section 25 determines whether the vehicle 10 is traveling or is in a stopped state based on the acceleration detected by the acceleration sensor 24. The acceleration that acts on the acceleration sensor 24 is increased as the vehicle speed is increased. If the acceleration detected by the acceleration sensor 24 is greater than or equal to a travel determination threshold value, the transmitter control section 25 determines that the vehicle 10 is traveling. If the acceleration detected by the acceleration sensor 24 is less than the travel determination threshold value, the transmitter control section 25 determines that the vehicle 10 is in a stopped state. The travel determination threshold value is set to a value greater than the acceleration detected by the acceleration sensor 24 when the vehicle 10 is in a stopped state while taking the tolerance into consideration. The transmitter control section 25 transmits the transmission data during traveling of the vehicle 10 at a higher frequency than when the vehicle 10 is in a stopped state.

The transmitter control section 25 also determines whether a failure has occurred based on the acquired detection value. A possible range is previously set for the detection value of each of the sensors 22, 23, 24, and 31. If a detection value that falls out of the range is detected, the transmitter control section 25 judges that a failure has occurred in the sensor 22, 23, 24, or 31 (for example, a break or a short-circuit).

The transmitter control section 25 of the transmitter 21 can be switched between a first state and a second state. The format (frame format) of the transmission data generated in the transmitter control section 25 differs between the first state and the second state. The transmission data generated when the transmitter control section 25 is in the first state is referred to as first data. The transmission data generated when the transmitter control section 25 is in the second state is referred to as second data. The first data will now be described.

As illustrated in FIGS. 3A and 4A, the first data includes a preamble, an identifying code, an ID code, a fixed bit, pressure data, temperature data, a status code, an error detection code, which is a code for detecting errors, and a stop bit. The first data is 100-bit data in total.

The ID code is 32-bit data. The ID code is stored in the transmitter memory 25b and is always the same unless the ID code is changed. Thus, the ID code is the fixed data having a certain value.

The fixed bit is 4-bit data. The fixed bit is, for example, data for computing the error detection code. The fixed bit is a predetermined value (fixed value). The ID codes of the four transmitters 21 differ from each other, but the fixed bit is the same.

The pressure data is 12-bit data. The pressure data is the pressure detected by the pressure sensor 22, that is, the data indicating the air pressure of the tire 13. The pressure detected by the pressure sensor 22 fluctuates. Thus, the pressure data is variable data that may have different values.

The temperature data is 8-bit data. The temperature data is the temperature detected by the temperature sensor 23, that is, the data indicating the temperature in the tire 13. The temperature detected by the temperature sensor 23 fluctuates. Thus, the temperature data is variable data that may have different values. In the tire condition monitoring system 20, the pressure data and the temperature data are the payload data, that is, the data that are intended to be received by the receiver 40. The payload data includes 20 bits, and the number of bits is less than that of the ID code.

The status code is 16-bit data. The status code is the data indicating the condition of the transmitter 21. The status code is variable data that may have different values.

The error detection code is 8-bit data. In this embodiment, the error detection code is used as a code for detecting errors. However, instead of the error detection code, an error correction code may be used. That is, the code for performing error detection refers to, besides the error detection code that performs only the error detection, the error correction code that performs correction of errors in addition to the error detection.

The error detection code may be any error detection code such as a parity bit, a checksum, and mirror data. The error correction code may be any error correction code such as a BCH code, an RS code, a Hamming code, a turbo code, and a convolutional code.

The checksum is used as the error detection code. The checksum is computed from the ID code, the fixed bit, the pressure data, the temperature data, and the status code. Since the checksum includes 8 bits, the data used for computing the checksum is set to 8 bits.

As illustrated in FIG. 4A, the 32-bit ID code is divided into four, so that each piece of the divided data includes 8 bits. FIG. 4A illustrates the divided ID codes as ID1, ID2, ID3, and ID4. FIG. 4A illustrates an example of the first data transmitted from the transmitter 21 mounted on the front right wheel assembly FR.

The 12-bit pressure data is divided into two, and one of the pieces of the divided data includes 4 bits and the other one of the pieces of the divided data includes 8 bits. FIG. 4A illustrates 4-bit data of the divided data as pressure 1 and the 8-bit data of the divided data as pressure 2. The pressure 1, which is the 4-bit data, and the fixed bit, which includes 4 bits, are combined to form 8-bit data. More specifically, 8-bit data is generated that includes the fixed bit as the upper 4 bits and the pressure 1 as the lower 4 bits.

The 16-bit status code is divided into two, and each piece of the divided data includes 8 bits. FIG. 4A illustrates the divided status codes as status 1 and status 2.

When generating the transmission data, the transmitter control section 25 computes the checksum based on the sum of multiple pieces of data combined to form the 8-bit data. The checksum is a value obtained by taking the exclusive OR of the above-described pieces of data.

The preamble is 16-bit data. The identifying code is 2-bit data. The stop bit is 2-bit data. The preamble, the identifying code, and the stop bit are data set by, for example, a protocol. These pieces of data are not used for computing the error detection code. FIGS. 4A and 4B omit the data strings of the pieces of data not used for computing the error detection code.

The second data will now be described.

As illustrated in FIGS. 3B and 4B, the second data refers to the transmission data obtained by omitting the ID code and the fixed bit from the first data. The second data is shorter in the data length than the first data by the length corresponding to the ID code and the fixed bit and is 64-bit data.

As illustrated in FIG. 4B, in the second data, the ID code and the fixed bit are omitted. However, the error detection code computed in the same manner as the first data is used. More specifically, the error detection code computed from the ID code, the fixed bit, the pressure data, the temperature data, and the status code is used. That is, the second data is the transmission data that includes the error detection code computed based on data including the ID code and the fixed bit, but does not include the ID code and the fixed bit. FIG. 4B shows an example of the second data transmitted from the transmitter 21 mounted on the front right wheel assembly FR.

As illustrated in FIG. 2, the trigger receiving section 32 receives, through the receiving antenna 29, trigger data transmitted from a trigger device 50. The trigger data is transmitted as a trigger signal that is modulated by the trigger device 50. The trigger receiving section 32 demodulates the trigger signal and outputs the trigger data to the transmitter control section 25. The trigger device 50 is a device that causes the transmitters 21 to perform various operations. The transmitter control section 25 performs various operations in response to the trigger data. The trigger data includes, for example, data that requests the transmitter 21 to transmit data, data that requests changing of the transmission intervals of the data, data that requests the transmitter memory 25b of the transmitter 21 to store the ID code, and data that updates the software of the transmitter 21. The trigger device 50 is provided in, for example, a factory that manufactures the transmitters 21, a factory where the transmitters 21 are mounted on the wheel assemblies 11, and dealers.

As illustrated in FIGS. 1 and 2, the trigger device 50 includes manipulation portions 51, a trigger device transmission circuit 52, a trigger device reception circuit 53, a display 54, a trigger device control section 55, a trigger device transmitting antenna 56, and a trigger device receiving antenna 57. The manipulation portions 51 are manipulated by a user. The manipulation portions (switches) 51 correspond to operations that can be performed by the transmitters 21. The trigger data that requests the operation corresponding to the manipulation of the manipulation portion 51 is transmitted from the trigger device 50.

The manipulation portions 51 are connected to the trigger device control section 55. The trigger device control section 55 generates the trigger data in response to the manipulation of the manipulation portions 51. The trigger data includes, as described above, data that requests the transmitter 21 to transmit the transmission data.

The trigger device control section 55 outputs the generated trigger data to the trigger device transmission circuit 52. The trigger device transmission circuit 52 generates a trigger signal corresponding to the trigger data. The trigger signal is transmitted from the trigger device transmitting antenna 56. The trigger signal is, for example, a signal in an LF band (for example, a signal in the 125 kHz band).

The trigger device reception circuit 53 receives, through the trigger device receiving antenna 57, the radio signal transmitted from the transmitters 21. The trigger device reception circuit 53 demodulates the radio signal and outputs the demodulated signal to the trigger device control section 55.

As illustrated in FIG. 1, the receiver 40 includes a receiver control section 41, a receiver reception circuit 42, and a receiving antenna 43. The receiver control section 41 is connected to an alarm 44. The receiver control section 41 is, for example, a microcomputer including a receiver CPU 41a and a receiver memory 41b (such as a ROM and a RAM). The receiver reception circuit 42 demodulates the radio signal received through the receiving antenna 43 from the transmitters 21 and outputs the transmission data to the receiver control section 41. The receiver reception circuit 42 functions as a receiving section.

The receiver control section 41 grasps the condition of the tires 13 (for example, the tire air pressure and the temperature in the tires) based on the transmission data from the receiver reception circuit 42. If an abnormality occurs in any of the tires 13, the receiver control section 41 informs an occupant using the alarm (informing device) 44. The alarm 44 includes, for example, a device that informs an occupant of an abnormality by lighting up or flashing and a device that informs an occupant of an abnormality by a sound. The receiver may be a portable terminal held by an occupant of the vehicle 10.

The receiver memory 41b stores the ID codes and the fixed bit of the four transmitters 21 mounted on the wheel assemblies 11 of the vehicle 10 on which the receiver 40 is mounted. Thus, the ID codes are registered in the receiver 40. Each transmitter memory 25b and the receiver memory 41b store the same ID codes. Thus, the receiver 40 and the transmitters 21 are associated with each other. The receiver control section 41 recognizes only the transmission data that is transmitted from the four transmitters 21 mounted on the wheel assemblies 11 of the vehicle 10 on which the receiver 40 is mounted as the transmission data that is intended to be transmitted to itself. The receiver control section 41 verifies the identification information (ID code) registered in the transmitter 21 that has transmitted the transmission data against the identification information (ID code) registered in the receiver 40 based on the transmission data received by the receiver reception circuit 42 and the ID code stored in the receiver memory 41b. If it is judged that the transmission data is transmitted from the transmitter 21 associated with the receiver 40, the receiver control section 41 adopts the data indicating the condition of the tire 13 (the pressure data and the temperature data) included in the transmission data as the data of the vehicle 10 on which the receiver 40 is mounted. In the following description, the transmission data transmitted from the transmitters 21 that are associated with the receiver 40, that is, the transmission data transmitted from the transmitters 21 in which the ID codes that are the same as the ID codes stored in the receiver memory 41b are registered will be referred to as authorized data. The data that is different from the authorized data, that is, the transmission data transmitted from a transmitter that is not associated with the receiver 40 is referred to as non-authorized data.

As described above, the transmitters 21 transmit the first data and the second data as the transmission data. The process performed by the receiver control section 41 for verification of the ID codes differs between the case in which the first data is received as the transmission data and the case in which the second data is received as the transmission data.

If the receiver reception circuit 42 receives the first data, the receiver control section 41 acquires the ID code contained in the first data and verifies the ID code against the ID code stored in the receiver memory 41b. Thus, in the first data, the ID code serves as the verification data. If the ID code contained in the first data matches any of the ID codes stored in the receiver memory 41b, the receiver control section 41 determines that the first data is authorized data. If the ID code contained in the first data does not match any of the ID codes stored in the receiver memory 41b, the receiver control section 41 determines that the first data is non-authorized transmission data.

If the receiver reception circuit 42 receives the second data, the receiver control section 41 verifies the ID code based on the error detection code contained in the second data. Thus, in the second data, the error detection code serves as the verification data. If the receiver reception circuit 42 receives the second data, the receiver control section 41 computes the error detection code from the second data, the ID code stored in the receiver memory 41b, and the fixed bit. The computation of the error detection code is performed in the same manner as in the transmitters 21. That is, the transmitter memory 25b and the receiver memory 41b store a program to compute the error detection code in the same manner.

The receiver control section 41 computes the 8-bit error detection code from the ID code and the fixed bit stored in the receiver memory 41b in addition to the pressure data, the temperature data, and the status code contained in the second data. Since the receiver memory 41b stores four ID codes corresponding to the four wheel assemblies 11, four error detection codes are computed. If the ID code (and the fixed bit) of the transmitter 21 matches the ID code (and the fixed bit) registered in the receiver 40, the error detection code contained in the second data matches the error detection code computed by the receiver control section 41. More specifically, the transmitter 21 and the receiver 40 compute the error detection code in the same manner. Among the pieces of data used for computing the error detection code, the pressure data, the temperature data, and the status code are the same as long as no abnormality is caused. If the ID code of the transmitter 21 that has transmitted the transmission data match the ID code in the receiver 40, the ID codes (and the fixed bits) also match each other. Thus, the same computation is performed using the same data. For this reason, the error detection codes, which are the computed data, match each other between the transmitter 21 and the receiver 40. Consequently, the ID code of the transmitter 21 is verified against the ID code in the receiver 40 by checking whether the error detection code, which is the computation data contained in the second data, matches the error detection code computed by the receiver control section 41.

For example, as illustrated in FIG. 5, assume that the receiver memory 41b stores four ID codes corresponding to the front right wheel assembly FR, the front left wheel assembly FL, the rear right wheel assembly RR, and the rear left wheel assembly RL.

As illustrated in FIG. 6, if the error detection codes (checksums) are computed using the ID codes corresponding to the front right wheel assembly FR, the front left wheel assembly FL, the rear right wheel assembly RR, and the rear left wheel assembly RL, the error detection code computed using the ID code corresponding to the front right wheel assembly FR matches the error detection code contained in the second data.

If the error detection code contained in the second data matches any of the error detection codes computed by the receiver control section 41, the receiver control section 41 determines that the second data is authorized data. If the error detection code contained in the second data matches none of the error detection codes computed by the receiver control section 41, the receiver control section 41 determines that the second data is non-authorized data.

The receiver control section 41 functions as an acquiring section, which acquires the verification data and the variable data from the transmission data. The receiver control section 41 functions as verifying section, which performs verification based on the verification data and the ID codes stored in the receiver memory 41b. The acquiring section (acquiring means) and the verifying section (verifying means) are implemented as the function of the receiver control section 41.

The receiver control section 41 computes the error detection code from data including the fixed bit in addition to the ID code. This is because the transmitter control section 25 also computes the error detection code from data including the fixed bit. That is, the data that is not contained in the second data although the data is used for the computation of the error detection code may be, but does not necessarily have to be, only the ID code or may be the ID code and the fixed bit. The data that is not contained in the second data although the data is used for the computation of the error detection code may be the fixed values (fixed data) including at least the ID code and any data that can be stored in the receiver memory 41b and used for the computation of the error detection code. The ID codes and the fixed bit may be regarded as the fixed data.

The receiver control section 41 is capable of restoring the ID code of the transmitter 21 from the error detection code. As described above, if the error detection code contained in the second data matches the error detection code computed by the receiver control section 41, the ID code used for the computation of the error detection code is presumed to be the ID code of the transmitter 21 that has transmitted the second data. Thus, the error detection code, which serves as the computation data, may be perceived as the restoration data that is capable of restoring the ID code to the receiver control section 41 and that has a shorter data length than the ID code. The first data and the second data may be distinguished by the difference in the data length between the first data and the second data. Also, in the transmitter 21, the identifying code may differ between the first data and the second data, and the receiver control section 41 may distinguish the first data and the second data by the identifying code.

If the ID code of the transmitter 21 that has transmitted the transmission data is verified against the ID code registered in the receiver 40 using the second data, there is a case in which the error detection codes match each other although the ID code registered in the transmitter 21 does not match the ID code registered in the receiver 40.

This is caused by the difference between the data length of the ID code and the data length of the error detection code. Since the data length of the ID code is 32 bits, the ID code may have 2^32 different data strings (bit strings). In contrast, since the error detection code is 8 bits, the error detection code may have 2^8 different data strings (bit strings) only. That is, the number of combinations of the error detection code is less than the number of combinations of the ID code. Due to this fact, depending on the value of the variable data, the error detection codes match each other although the ID code registered in the transmitter 21 does not match the ID code registered in the receiver 40.

As a result, when the error detection code is computed using the ID codes, there are multiple ID codes with which the same error detection code is computed. For example, among the ID codes illustrated in FIG. 6, the data (binary numbers) of ID2, which is the data obtained by dividing the ID code of the rear left wheel assembly RL, is changed from 00000010 to 01000011. In this case, the error detection code computed using the ID code corresponding to the front right wheel assembly FR and the error detection code computed using the ID code corresponding to the rear left wheel assembly RL have the same value. Thus, in a case in which the ID code is recognized (restored) from the error detection code contained in the second data, an erroneous ID code may possibly be recognized (restored). In the example described above, it is impossible to determine whether the ID code of the transmitter 21 that has transmitted the second data is the ID code corresponding to the front right wheel assembly FR or the ID code corresponding to the rear left wheel assembly RL. That is, it is impossible to determine whether the transmission data is transmitted from the transmitter 21 mounted on the front right wheel assembly FR or the transmitter 21 mounted on the rear left wheel assembly RL.

Assume that another vehicle equipped with the tire condition monitoring system 20 that is the same as the present embodiment is located in the vicinity of the vehicle 10. The error detection code contained in the second data transmitted from the transmitter mounted on that vehicle might match the error detection code computed by the receiver 40 by coincidence. In this case, the second data that is transmitted from the transmitter mounted on that vehicle may possibly be recognized as authorized data erroneously.

As described above, the first data is the transmission data that has a long data length and is capable of allowing the receiver 40 to recognize the correct ID code of the transmitter 21 unless an error occurs in the first data. In contrast, the second data is the transmission data that has a short data length and cannot cause the receiver 40 to correctly recognize the ID code of the transmitter 21.

It is possible to cause the receiver 40 or the trigger device 50 to correctly recognize the ID code when necessary while reducing the power consumption of the battery 30 by switching between the first state, in which the first data is transmitted, and the second state, in which the second data is transmitted.

Figures 7, 8:
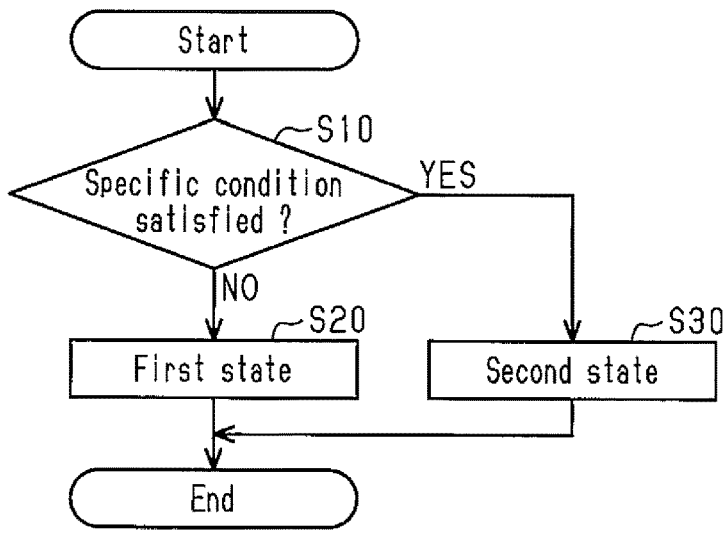
FIG. 7 is a flowchart of a process performed by the transmitter control section.
FIG. 8 is a table illustrating the ID codes shuffled in accordance with a shuffling pattern.

As illustrated in FIG. 7, in step S10, the transmitter control section 25 determines whether a specific condition is satisfied. If the specific condition is not satisfied (NO), the transmitter control section 25 is switched to the first state to transmit the first data (step S20). If the specific condition is satisfied (YES), the transmitter control section 25 is switched to the second state to transmit the second data (step S30). The transmitter control section 25 functions as the control section for switching between the first state and the second state. That is, a data generating section (data generating means) for generating data and the control section (control means) for switching the data generating section between the first state and the second state function as the transmitter control section 25. That is, the transmitter control section 25 includes a function to generate the first data, a function to generate the second data, and a function to switch between the first state and the second state.

The specific condition refers to whether the number of times the process has been performed by the transmitter control section 25 exceeds a process threshold value from the point in time when counting is started. The transmitter memory 25*b* counts the number of times the process has been performed and stores a program for determining whether the number of times the process has been performed exceeds the process threshold value. The counting starting point in time is during the manufacture of the transmitter 21 (at the activation of the transmitter 21), but the counting starting point in time can be reset by transmitting the trigger signal from the trigger device 50. That is, the counting starting point in time is started can be determined by the trigger data.

The process includes, for example, a transmitting process, a measuring process, a timing process, a traveling time measuring process, a travel determination process, and a receiving process. The process threshold value may be previously stored in the transmitter memory 25*b* or may be set by the trigger device 50.

The transmitting process is a process for transmitting the transmission data to the receiver 40. The measuring process is a process for measuring the detection value of the sensors 22, 23, 24, and 31 (acquiring the outputs from the sensors 22, 23, 24, and 31). The timing process is a process for adding up the time by the timing function of the transmitter control section 25 (incrementing process of the counter).

The traveling time measuring process is a process for measuring the traveling time of the vehicle 10. As described above, the transmitter control section 25 acquires the acceleration detected by the acceleration sensor 24 at each predetermined acquisition interval and judges whether the vehicle 10 is traveling or is in a stopped state. The traveling time is measured by multiplying the number of times it is determined that the acceleration exceeds the travel determination threshold value by the acquisition interval.

The travel determination process is a process for measuring the number of times the vehicle 10 has traveled and in a stopped state. The number of times the vehicle 10 has traveled and stopped can be measured by measuring the number of times the acceleration detected by the acceleration sensor 24 has exceeded or fallen below the travel determination threshold value.

The receiving process is a process for receiving the trigger signal.

The process counted for determining whether a specific condition is satisfied may be one of the above-described processes or some of the above-described processes. In a case in which one of the processes is counted, if the number of times the process is performed exceeds a predetermined process threshold value, it is determined that the specific condition is satisfied.

In a case in which multiple processes are counted, an individual process threshold value is set for each of the processes. The transmitter control section 25 may judge that the specific condition is satisfied if all the processes have been performed by the number of times greater than or equal to the associated process threshold value. Alternatively, it may be judged that the specific condition is satisfied if two or more (not all) of the processes are performed by the number of times greater than or equal to the associated process threshold value. In other words, in a case in which the number of times each of the multiple processes is performed is individually counted to judge whether the specific condition is satisfied based on the number of times the processes are performed, it is determined whether the specific condition is satisfied based on whether a given number of the processes among the multiple processes have been performed by the number of times greater than or equal to the associated process threshold value. The given number of the processes may be previously stored in the transmitter memory 25b or may be set by the trigger device 50.

The process threshold values may be set to a value at which the specific condition will be satisfied after the transmitters 21 are manufactured (activated) and are mounted on the wheel assemblies 11. That is, the first data is transmitted from the transmitters 21 at least at the factory where the transmitters 21 are mounted on the wheel assemblies 11. At the factory that manufactures the transmitters 21 and the factory that mounts the transmitters 21 on the wheel assemblies 11, the ID codes are registered using the trigger device 50. At this time, it is checked whether the ID code is stored in the transmitter memory 25b. The checking is performed by causing the transmitter 21 to transmit the transmission data, receiving the transmission data by the trigger device 50, and checking the ID code contained in the received transmission data. The ID codes of the transmitters 21 cannot be registered in the trigger device 50 that receives the transmission data transmitted from an indefinite number of transmitters 21. Thus, even if the trigger device 50 receives the second data, the trigger device 50 cannot recognize the ID code from the second data. Even if the ID codes are registered in the trigger device 50 so that it is possible to infer the ID code from the second data, the ID code may possibly be incorrect as described above. Thus, in order to check the ID code registered in the transmitter 21, it is necessary to cause the transmitter 21 to transmit the first data.

In order to register the ID code in the receiver 40, that is, in order to associate the receiver 40 with the transmitter 21, the transmitter 21 is caused to transmit the transmission data to the receiver 40, and the receiver memory 41b is caused to store the ID code contained in the transmission data. Since the receiver memory 41b does not store the ID code before the ID code is registered to the receiver 40, the ID code cannot be recognized even if the second data is received. Thus, in order to register the ID code to the receiver 40, it is necessary to cause the transmitter 21 to transmit the first data.

The routine of steps S10 to S30 is periodically performed. The number of times the process has been performed is increased as the vehicle 10 travels or the time elapses. Thus, if the number of times the process has been performed becomes greater than or equal to the process threshold value, the number of times the process has been performed does not become less than the threshold value unless the number of times the process has been performed is reset. That is, once the specific condition is satisfied, the transmitter control section 25 is maintained in the second state from then on.

It can also be determined again that the specific condition is not satisfied by a command from the trigger device 50 (by resetting the counting starting point in time).

If it is determined that a failure has occurred in any of the sensors 22, 23, 24, and 31, the transmitter control section 25 is switched from the second state to the first state by resetting the number of times the process has been performed. When a failure occurs in any of the sensors 22, 23, 24, and 31, the trigger data is transmitted to check the operation of the sensors 22, 23, 24, and 31. At this time, the first data is transmitted so that the ID code of the transmitter 21 can be checked.

If the specific condition is satisfied, and the transmitter control section 25 is switched to the second state, the second data is transmitted from the transmitter 21. The second data is transmitted, for example, after distribution of the vehicle 10 on which the transmitters 21 are mounted to the market. After the distribution of the vehicle 10 to the market, since the ID codes are registered to both the transmitters 21 and the receiver 40, it is unnecessary to check the ID codes with the trigger device 50 or to transmit the ID codes to the receiver 40 for the registration of the ID codes.

As described above, the error detection code contained in the second data may sometimes match multiple error detection codes computed by the receiver control section 41. That is, there may be a case in which the ID code of the transmitter 21 cannot be recognized. In this case, the second data containing the error detection code is not treated as authorized data. That is, the pressure data and the temperature data contained in the second data are not used as the data indicating the condition of any of the tires 13 of the vehicle on which the receiver 40 is mounted. The second data is assumed to be authorized data only if the error detection code contained in the second data matches only one of the error detection codes computed by the receiver control section 41.

The possibility that the error detection code contained in the second data matches one of the error detection codes computed by the receiver control section 41 is higher than the possibility that the error detection code contained in the second data matches multiple error detection codes computed by the receiver control section 41. Furthermore, the second data is periodically transmitted. Thus, even if the second data containing the error detection code is not treated as authorized data in a case in which there is the error detection code that incidentally matches multiple error detection codes computed by the receiver 40, the data indicating the condition of the tire 13 is obtained from the subsequently transmitted authorized data.

As described above, if the receiver 40 receives the second data that is transmitted from the transmitter that is mounted on a vehicle different from the vehicle 10, the receiver 40 may possibly recognize non-authorized data as authorized data erroneously. However, the probability that non-authorized data is erroneously recognized as authorized data is lower than the probability that non-authorized data is not erroneously recognized as authorized data. Since the transmission data (second data) is periodically transmitted, even if non-authorized data is erroneously recognized as authorized data, the erroneous information (the air pressure data and the temperature data) is updated upon reception of the subsequently transmitted authorized data.

As described above, even if the second data is used for the transmission and the reception of data, there is no problem in the practical use of the tire condition monitoring system 20.

Next, the operation of the transmitters 21, the receiver 40, and the tire condition monitoring system 20 will be described.

The transmitters 21 transmit the first data or the second data. The receiver 40 is capable of verifying the ID code in either the case in which the first data is received or the case in which the second data is received. Thus, the tire condition monitoring system 20, which includes the transmitters 21 and the receiver 40, transmits and receives both the first data and the second data.

The tire condition monitoring system 20 automatically recognizes which of the four transmitters 21 is mounted on which of the wheel assemblies 11 by the transmission data transmitted from the transmitters 21 and by grasping the rotation position of the wheel assemblies 11 based on an antilock brake system. In the tire condition monitoring system 20 in which the second data is used for transmitting and receiving data, it is automatically recognized which of the four transmitters 21 is mounted on which of the wheel assemblies 11.

The above-described embodiment achieves the following advantages.

(1) If the transmitter control section 25 is in the second state, the second data is transmitted to the receiver 40. The second data contains the error detection code that has a shorter data length than the ID code as the verification data that causes the receiver control section 41 to perform verification. The data length of the verification data is reduced compared with a case in which the data obtained by taking the exclusive OR of the ID code and the variable data is used as the verification data. In particular, the proportion of the ID code in the entire transmission data is often great, and the data length of the transmission data tends to increase due to the data length of the ID code. The data length of the entire transmission data is reduced by using the second data that omits the ID code, and the power consumption required for transmitting the transmission data (second data) is reduced. Thus, the life of the battery 30 is extended.

(2) When the transmitter control section 25 is in the first state, the first data is transmitted to the receiver 40. The first data includes the ID code itself as the verification data for causing the receiver control section 41 of the receiver 40 to perform verification. Thus, the receiver 40 and the trigger device 50 are allowed to correctly recognize the ID code. Thus, if it is necessary to cause the receiver 40 or the trigger device 50 to recognize the ID code, the transmission data containing the ID code is transmitted.

That is, since the transmitter control section 25 is capable of being switched between the first state and the second state, the format of the transmission data is changed as required.

(3) The code for detecting an error (error detection code) is used as the computation data. The error detection code is computed even in a case in which the error detection code is not used as the verification data. The data length is reduced by using the error detection code also as the computation data.

(4) The transmitters 21 are mounted on the wheel assemblies 11. The transmitters 21 detect the condition of the tires 13 of the wheel assemblies 11 on which the transmitters 21 are mounted and transmit the detected data to the receiver 40. The detection values detected by the pressure sensor 22 and the temperature sensor 23 vary depending on the traveling condition, the surrounding environment, and a measurement error. Thus, the error detection code is computed using the data indicating the detection values as the variable data. The data indicating the detection values is the payload data and is transmitted to the receiver 40 without fail. Thus, the data length is reduced compared with a case in which the error detection code is computed using variable data that is unnecessary for the receiver 40 to acquire.

It is difficult or impossible to replace the battery 30 in each of the transmitters 21 mounted on the wheel assemblies 11. In each transmitter 21, the electronic components such as the pressure sensor 22 and the battery 30 are accommodated and potted in a case. In this case, the battery 30 cannot be replaced. Even if each transmitter 21 allows the battery 30 to be replaced, since the transmitter 21 is located in the associated tire 13, it is necessary to remove the tire 13 from the wheel 12 to replace the battery 30. Thus, it is particularly desired to extend the life of the transmitters 21 mounted on the wheel assemblies 11.

Extending the life of the battery 30 reduces the frequency of replacement of the battery 30 in the transmitter 21 that allows the replacement of the battery 30. This saves time and trouble of the owner of the vehicle 10. This also extends the life of the transmitter 21 itself that does not allow the replacement of the battery 30.

(5) The transmitter control section 25 is switched from the first state to the second state if the number of times the process is performed becomes greater than or equal to the process threshold value. The number of times the process is performed is increased as the time elapses. The transmitter control section 25 is in the first state only during the period until the number of times the process is performed becomes greater than or equal to the process threshold value, and after this period has elapsed, the transmitter control section 25 is switched to the second state. The power consumption of the battery 30 is reduced by transmitting the first data only during the period in which it is assumed that the first data needs to be transmitted.

(6) In either the case in which the receiver reception circuit 42 receives the first data or the case in which the receiver reception circuit 42 receives the second data, the receiver control section 41 is capable of verifying the ID code of the transmitter 21 that has transmitted the transmission data against the ID code registered in the receiver 40. Thus, the transmitter 21 that transmits the error detection code as the verification data can be associated with the receiver 40 for use. That is, since the receiver 40 that is capable of verifying the ID code from the second data is used, the transmitters 21 that transmit the second data can be used. This extends the life of the batteries 30 of the transmitters 21.

(7) The receiver 40 receives the transmission data transmitted from the transmitters 21 mounted on the wheel assemblies 11. Since the vehicle 10 includes the multiple wheel assemblies 11, likewise, the vehicle 10 includes the multiple transmitters 21. The receiver 40 receives the transmission data transmitted from the multiple transmitters 21. Since the receiver memory 41b stores the ID codes of the multiple transmitters 21, it is determined whether the transmission data is authorized data by checking whether the ID code of the transmitter 21 matches any of the ID codes stored in the receiver memory 41b.

(8) The second data has a shorter data length than the first data. Thus, with the second data, an error is unlikely to be caused in the data (code) before being received by the receiver reception circuit 42 compared with the first data.

(9) The second data does not contain the ID code itself. To identify the ID code from the second data upon reception of the second data, the receiver needs to be aware of the ID code of the transmitter 21 that has transmitted the second data. Thus, even if a receiver other than the receiver 40 mounted on the vehicle 10 receives the second data, the ID code of the transmitter 21 cannot be recognized from the second data. This prevents leak of the ID code from the second data and improves the security of the transmitter 21.

(10) The tire condition monitoring system 20, which includes the transmitters 21 and the receiver 40, is capable of transmitting and receiving data in either the case in which the first data is used as the transmission data or the case in which the second data is used as the transmission data. Thus, the tire condition monitoring system 20 has the above-described advantages (1) to (9).

Second Embodiment

A transmitter, a receiver, and a transmitting and receiving system according to a second embodiment will now be described. In the following description, the same parts as those of the transmitter, the receiver, and the transmitting and receiving system according to the first embodiment will be denoted by the same reference numerals as those of the first embodiment, and description thereof will be omitted.

As illustrated in FIG. 8, the second embodiment differs from the first embodiment in the format (frame format) of the transmission data. As illustrated in FIG. 8, the transmission data of the second embodiment contains a shuffling pattern instead of the fixed bit. FIG. 8 illustrates, as one example of the transmission data, exemplary transmission data transmitted from the transmitter 21 mounted on the front right wheel assembly FR.

The shuffling pattern is 4-bit data. The shuffling pattern may have a randomly changing pattern (value) or a predetermined pattern (value) that is changed each time the transmission data is transmitted. That is, the shuffling pattern may have any value as long as the value is not always the constant value. The shuffling pattern is variable data.

The shuffling pattern refers to the data for shuffling (sorting) the ID code and specifies the rule with which the ID code is shuffled. The transmitter control section 25 changes the ID code in accordance with the shuffling pattern when transmitting the transmission data. Each bit of the shuffling pattern corresponds to ID1, ID2, ID3, or ID4. More specifically, the least significant bit of the shuffling pattern corresponds to ID1, the second least significant bit corresponds to ID2, the second most significant bit corresponds to ID3, and the most significant bit corresponds to ID4.

The ID1, ID2, ID3, and ID4 are shuffled depending on whether each bit of the 4-bit shuffling pattern represented by the binary number is 0 or 1. In this embodiment, in a case in which the binary number is 0, the ID code is not shuffled, and in a case in which the binary number is 1, the ID code is shuffled. In shuffling the ID code, the upper 4 bits and the lower 4 bits are swapped in each of ID1 to ID4.

For example, in FIG. 8, the shuffling pattern is 1100. Since the least significant bit and the second least significant bit are 0, the data of ID1 and ID2 corresponding to these bits are not shuffled. Since the most significant bit and the second most significant bit are 1, the data of ID3 and ID4 corresponding to these bits are shuffled. The rule (program) set by the shuffling pattern is stored in the transmitter memory 25b.

The first data of the second embodiment is data containing the preamble, the identifying code, the ID code (that has been shuffled), the shuffling pattern, the pressure data, the temperature data, the status code, the error detection code, and the stop bit. As used herein, the ID code refers to the ID code that has been shuffled in accordance with the rule set by the shuffling pattern. The error detection code is computed from the ID code that has been shuffled in accordance with the rule set by the shuffling pattern, the shuffling pattern, the pressure data, the temperature data, and the status code.

The second data of the second embodiment is data containing the preamble, the identifying code, the shuffling pattern, the pressure data, the temperature data, the status code, the error detection code, and the stop bit. The error detection code is computed from the ID code that has been shuffled in accordance with the rule set by the shuffling pattern, the shuffling pattern, the pressure data, the temperature data, and the status code. That is, the transmission data obtained by omitting the ID code from the first data serves as the second data. The second data is 68-bit data.

When the receiver reception circuit 42 receives the first data, the receiver control section 41 shuffles the ID code stored in the receiver memory 41b in accordance with the shuffling pattern contained in the first data. The rule (program) set by the shuffling pattern is stored in the receiver memory 41b. The rule stored in the receiver memory 41b is the same as the rule stored in the transmitter memory 25b. That is, the upper 4 bits are swapped with the lower 4 bits in ID1 to ID4 that corresponds to the bit of the shuffling pattern that takes 1. Since the ID code stored in the receiver memory 41b is shuffled in accordance with the rule that is the same as the rule used in the first data, the ID code contained in the transmission data can be verified against the ID code stored in the receiver memory 41b.

When the receiver reception circuit 42 receives the second data, the receiver control section 41 computes the error detection code from the second data and the ID code stored in the receiver memory 41b. The computation of the error detection code is performed in the same manner as in the transmitter 21.

The receiver control section 41 computes the 8-bit error detection code from the shuffling pattern, the pressure data, the temperature data, and the status code, which are contained in the second data, and additionally, the ID code stored in the receiver memory 41b. At this time, the ID code used for the computation is shuffled in accordance with the rule set by the shuffling pattern. The rule set by the shuffling pattern is the same as the rule set in the transmitter 21.

Thus, if the ID code of the transmitter 21 that has transmitted the transmission data match the ID code in the receiver 40, the transmitter control section 25 and the receiver control section 41 perform the same computation. Thus, the ID code of the transmitter 21 is verified against the ID code in the receiver 40 by checking whether the error detection code contained in the second data matches the error detection code computed by the receiver control section 41.

The computed error detection code is changed by shuffling the ID code in accordance with the shuffling pattern. In the example illustrated in FIG. 9, in a case in which ID1 to ID4 are not shuffled in accordance with the shuffling pattern, the error detection code computed using the ID code corresponding to the front right wheel assembly FR and the error detection code computed using the ID code corresponding to the rear left wheel assembly RL have the same value. If ID1 to ID4 are swapped in accordance with the shuffling pattern, the error detection code computed using the ID code corresponding to the front right wheel assembly FR and the error detection code computed using the ID code corresponding to the rear left wheel assembly RL do not have the same value. ID1 to ID4 in FIG. 9 indicate the data that have been shuffled in accordance with the shuffling pattern.

Therefore, in addition to the advantages (1) to (10) of the first embodiment, the second embodiment achieves the following advantages.

(11) The error detection code contained in the second data is kept from matching multiple error detection codes computed by the receiver control section 41 by shuffling the ID code in accordance with the shuffling pattern. Thus, the use of the shuffling pattern facilitates the ID code of the transmitter 21 that has transmitted the second data to be recognized by the receiver control section 41.

(12) The ID code is shuffled also when the first data is transmitted. Thus, if a receiver other than the receiver 40 mounted on the vehicle 10 receives the first data, the receiver cannot recognize the ID code of the transmitter 21 from the first data. This prevents leak of the ID code from the first data and improves the security of the transmitter 21.

Third Embodiment

A transmitter, a receiver, and a transmitting and receiving system according to a third embodiment will now be described. In the following description, the same parts as those of the transmitter, the receiver, and the transmitting and receiving system according to the first embodiment will be denoted by the same reference numerals as those of the first embodiment, and description thereof will be omitted.

The third embodiment differs from the first embodiment in the process for switching the transmitter control section 25 between the first state and the second state. In the first embodiment, the first state and the second state are switched in accordance with the number of times the process has been performed as the specific condition. In contrast, in the third embodiment, the first state and the second state are switched in accordance with the detection value of the sensor as the specific condition. The details will be described below.

The specific condition is whether the detection value is greater than or equal to a predetermined threshold value or less than the threshold value. The threshold value may be previously stored in the transmitter memory 25b or may be set by the trigger device 50. As described above, the transmitter control section 25 acquires the detection values detected by the pressure sensor 22, the temperature sensor 23, the acceleration sensor 24, and the voltage sensor 31 at the predetermined acquisition interval. The transmitter control section 25 switches the first state and the second state based on whether the detection value is greater than or equal to the threshold value, or less than the threshold value.

In a case in which the first state and the second state are switched using the pressure as the detection value, if the pressure is less than the predetermined threshold value, it is determined that the specific condition is not satisfied (first state). If the pressure is greater than or equal to the threshold value, it is determined that the specific condition is satisfied (second state).

In a case in which the transmitters 21 are mounted on the wheel assemblies 11, after each transmitter 21 is mounted on the corresponding wheel assembly 11, the trigger data is transmitted to the transmitter 21 to check the operation. Upon reception of the trigger data, the transmitter 21 transmits (returns) the transmission data containing various pieces of data. At this time, the first data needs to be transmitted for the trigger device 50 to recognize the ID code of the transmitter 21 that has returned the transmission data. After checking the operation of the transmitter 21, the tire 13 is inflated. Thus, if the pressure becomes greater than or equal to the threshold value, it is a state in which the tire 13 is inflated after the operation of the transmitter 21 has been checked. In this state, the first state is switched to the second state since the operation has already been checked, and the need for receiving the ID code with the trigger device 50 is low.

If an abnormality occurs in the tire 13, and the pressure becomes less than the threshold value, the transmitter control section 25 switches the second state to the first state so that the receiver 40 correctly recognizes the ID code, that is, so that it is possible to identify the position of the wheel assembly 11 on which the transmitter 21 that has transmitted the transmission data is mounted. A value at which it can be determined that the tire 13 has been inflated is set as the threshold value. For example, the threshold value is set to a value that is 80% of the specified air pressure, which is the air pressure recommended for the tire 13.

In a case in which the first state and the second state are switched using the acceleration as the detection value, if the acceleration is less than the predetermined threshold value, it is determined that the specific condition is not satisfied (first state). If the acceleration is greater than or equal to the threshold value, it is determined that the specific condition is satisfied (second state).

If the vehicle 10 is traveling, it is a state after the transmitters 21 have been mounted on the wheel assemblies 11 and after the vehicle 10 on which the transmitters 21 are mounted has been distributed to the market. In this state, it is determined that the use of the trigger device 50 at, for example, the factory such as checking the operation of the transmitters 21 has been finished, and the first state is switched to the second state. Thus, a value that can be used to determine whether the vehicle 10 is traveling or is in a stopped state, that is, the travel determination threshold value is set as the threshold value. In most cases, the trigger device 50 is used in a state in which the vehicle 10 is in a stopped state. Since there is a possibility of receiving the trigger data when the vehicle 10 is stopped, the transmitter control section 25 switches the second state to the first state to allow the trigger device to identify the ID code.

In a case in which the first state and the second state are switched using the temperature as the detection value, if the temperature is greater than or equal to the predetermined threshold value, it is determined that the specific condition is not satisfied (first state). If the temperature is less than the threshold value, it is determined that the specific condition is satisfied (second state).

In winter, for example, if the battery 30 is allowed to discharge in a state in which the environmental temperature is significantly low, the life of the battery 30 is decreased. Since the first state consumes more power of the battery 30 than the second state, the decrease in the life of the battery 30 is limited by switching the transmitter control section 25 to the second state if the temperature is less than the threshold value. The threshold value is set to a value at which it can be determined that the environmental temperature is significantly low, such as a freezing point.

In a case in which the first state and the second state are switched using the voltage as the detection value, if the voltage is greater than or equal to the predetermined threshold value, it is determined that the specific condition is not satisfied (first state). If the voltage is less than the threshold value, it is determined that the specific condition is satisfied (second state).

As the remaining power of the battery 30 is decreased, the voltage of the battery 30 is decreased. If the remaining power of the battery 30 is small, the first state is switched to the second state to extend the life of the battery 30. The threshold value is set to a voltage of a case in which the remaining power of the battery 30 is significantly decreased.

Additionally, the transmitter control section 25 may switch the first state and the second state based on some of the detection values described above. That is, besides a case in which the specific condition of step S10 is determined to be satisfied if one of the specific conditions determined by the above-described detection values is satisfied, the specific condition of step S10 may be determined to be satisfied if all the specific conditions have been satisfied. Additionally, the specific condition of step S10 may be determined to be satisfied if one or more (not all) of the specific conditions determined by the above-described detection values have been satisfied.

Therefore, in addition to the advantages (1) to (10) of the first embodiment, the third embodiment achieves the following advantage.

(13) The transmitter control section 25 switches between the first state and the second state based on the detection values from the sensors 22, 23, 24, and 31 provided in the transmitter 21. Each transmitter 21 acquires the detection values at predetermined intervals in order to monitor the condition of the tire 13 and the condition of the transmitter 21. These detection values are used to switch the first state and the second state so that the first state and the second state are switched using the detection values for monitoring the condition of the tire 13 and the condition of the transmitter 21. It is, therefore, unnecessary to acquire detection values just for switching between the first state and the second state. This limits the increase in the power consumption of the battery 30.

Fourth Embodiment

A transmitter, a receiver, and a transmitting and receiving system according to a fourth embodiment will now be described. In the following description, the same parts as those of the transmitter, the receiver, and the transmitting and receiving system according to the first embodiment will be denoted by the same reference numerals as those of the first embodiment, and description thereof will be omitted.

The transmitter control section 25 of the fourth embodiment operates such that both the first data and the second data are periodically transmitted. The transmitter control section 25 transmits the second data more frequently than the first data. The first data is transmitted less frequently than the second data.

For example, the transmitter control section 25 may be switched between the first state and the second state at predetermined intervals. In this case, the interval at which the first state is switched to the second state is shorter than the interval at which the second state is switched to the first state. Thus, the second data is transmitted more frequently than the first data.

Alternatively, whether the first data is transmitted or the second data is transmitted when the transmission data is transmitted may be determined randomly. In this case, the probability that the first data is transmitted is less than the probability that the second data is transmitted. Thus, the second data is transmitted more frequently than the first data.

Furthermore, the first data may be transmitted by a predetermined number of times after the vehicle 10 is brought into the startup state (ignition ON state) by the start switch (ignition switch) of the vehicle 10, and the second data may be transmitted after the first data has been transmitted by the predetermined number of times. Similarly, the first data may be transmitted by a predetermined number of times after the vehicle 10 is brought into a stopped state (ignition OFF state) by the start switch (ignition switch) of the vehicle 10, and the second data may be transmitted after the first data has been transmitted by the predetermined number of times. The predetermined number of times is set to the number of times at which the first data is reliably received by the receiver 40 even under the environment in which the receiver 40 is hard to receive the first data due to, for example, the influence of the communication environment.

Therefore, in addition to the advantages (1) to (10) of the first embodiment, the fourth embodiment achieves the following advantage.

(14) Since the transmitter control section 25 transmits both the first data and the second data periodically, the receiver control section 41 periodically checks whether the ID code stored in the receiver memory 41b is correct. Also, the increase in the power consumption of the battery 30 caused by transmitting the first data is limited by transmitting the second data more frequently than the first data.

Fifth Embodiment

A transmitter, a receiver, and a transmitting and receiving system according to a fifth embodiment will now be described.

Figure 10:
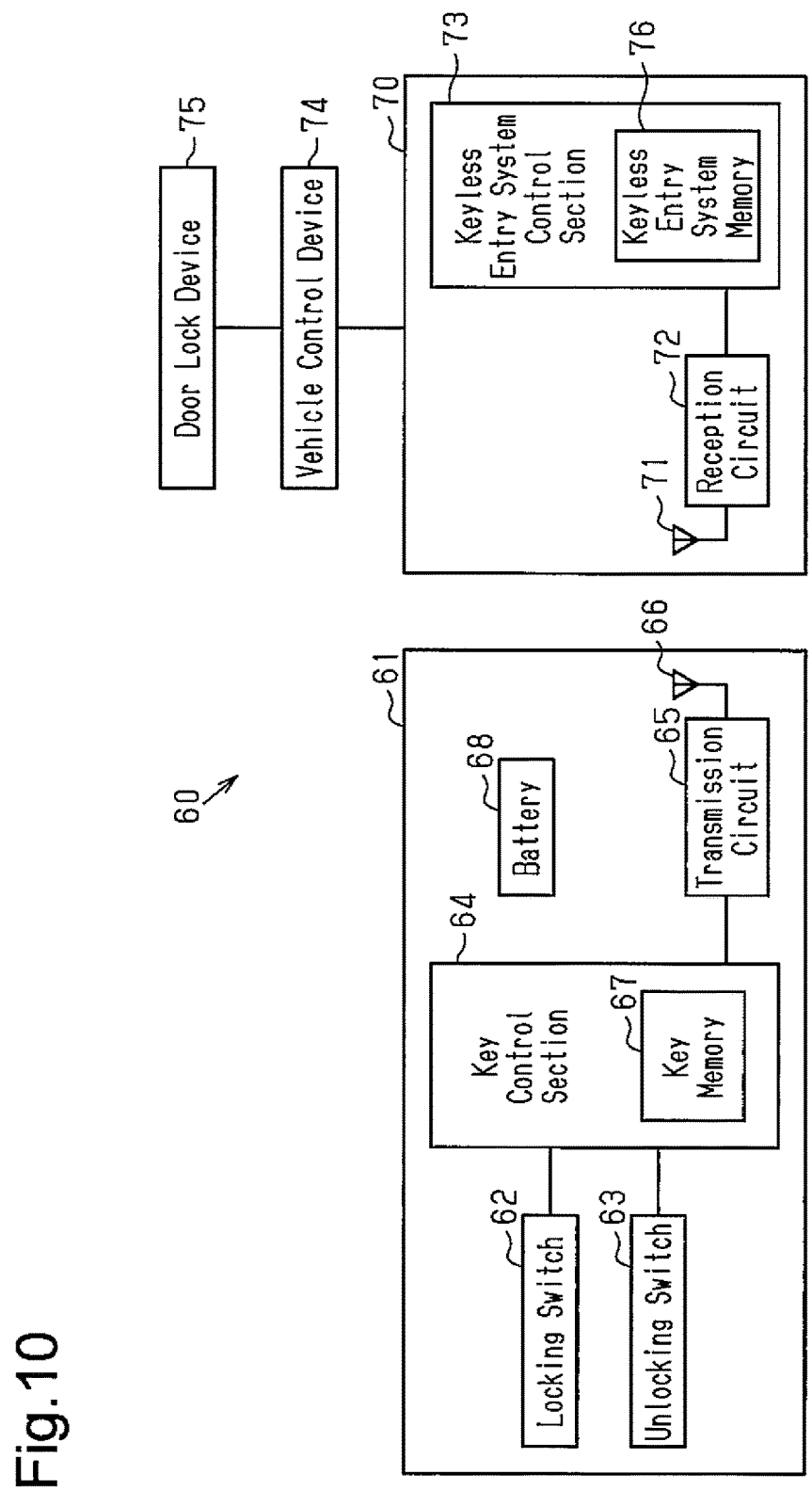
FIG. 10 is a block diagram illustrating a vehicle communication system according to a fifth embodiment.

As illustrated in FIG. 10, the transmitting and receiving system, which is a vehicle communication system 60 in this embodiment, includes a transmitter 61 and a receiver 70. The vehicle communication system 60 is a keyless entry system. The keyless entry system is a system for locking and unlocking the vehicle doors by receiving the transmission data transmitted from the transmitter 61 (electronic key) with the receiver 70 mounted on the vehicle.

The transmitter 61 includes a locking switch 62, which is manipulated to lock the doors, an unlocking switch 63, which is manipulated to unlock the doors, a key control section 64, a transmission circuit 65, a transmitting antenna 66, and a power source, which is a battery 68 in this embodiment.

Upon manipulation, the locking switch 62 and the unlocking switch 63 output an electrical signal to the key control section 64.

The key control section 64, which serves as the data generating section and the control section, is, for example, a microcomputer including a CPU and a key memory (such as a RAM and a ROM) 67. The transmitter memory, which is a key memory 67 in this embodiment, stores the ID code, which is data indicating the identification information unique to the transmitter 61. The key memory 67 also stores various programs that control the transmitter 61. The programs include, for example, a program that switches the state of the transmission data is transmitted from the transmitter 61.

The key control section 64 recognizes manipulation of the locking switch 62 or the unlocking switch 63 upon reception of the electrical signal from the locking switch 62 or the unlocking switch 63. The key control section 64 also detects the time during which the unlocking switch 63 is manipulated. That is, the key control section 64 determines whether the unlocking switch 63 is manipulated for a predetermined period of time or more, or whether a hold down action is performed.

The key control section 64 generates the transmission data in response to the manipulation of the locking switch 62 or the unlocking switch 63. The transmission data contains, as the payload data, the door data that relates to the operation of the door. The door data contains data indicating a lock command that requests locking of the door, data indicating an unlock command that requests unlocking of the door, and data indicating a door opening command that requests the opening of the sliding doors.

When the locking switch 62 is manipulated, the key control section 64 generates the transmission data containing data indicating the lock command. When the unlocking switch 63 is manipulated, the key control section 64 generates the transmission data containing data indicating the unlock command. When the unlocking switch 63 is manipulated for the predetermined period of time or more (hold down action), the key control section 64 generates the transmission data containing data indicating the door opening command. The door data is variable data that may have different values depending on the manipulation of the locking switch 62 and the unlocking switch 63.

The data contained in the transmission data includes, besides the door data, the preamble, the ID code, and the rolling code. The rolling code is variable data. Like the transmitter control section 25 of the first embodiment, the key control section 64 computes the error detection code from the ID code, which is the fixed data, and the variable data.

The key control section 64 is switched to the first state or the second state. The first data transmitted in the first state contains the ID code. The second data transmitted in the second state is data obtained by omitting the ID code from the first data. The key control section 64 outputs the generated transmission data to the transmission circuit 65. The transmission circuit 65 modulates the transmission data. The modulated transmission data is transmitted from the transmitting antenna 66 as a radio signal. The radio signal is transmitted as, for example, a UHF band signal.

For example, the first state and the second state may be switched depending on whether the number of times of the process performed by the key control section 64 has exceeded a process threshold value. The process includes, for example, the transmitting process. The transmitting process is a process for transmitting the transmission data.

The receiver 70 includes a receiving antenna 71, a reception circuit 72, and a keyless entry system control section 73. The receiver 70 is connected to a vehicle control device 74 mounted on the vehicle. The vehicle control device 74 controls various devices mounted on the vehicle. The vehicle control device 74 is connected to a door lock device 75. The door lock device 75 is a device for locking and unlocking the doors.

The keyless entry system control section 73 is, for example, a microcomputer including a CPU and a keyless entry system memory (a ROM and a RAM) 76. The reception circuit 72 demodulates the radio signal received through the receiving antenna 71 and outputs the transmission data to the keyless entry system control section 73. The reception circuit 72 functions as the receiving section. The receiver memory, which is a keyless entry system memory 76 in this embodiment, stores the ID code of the transmitter 61 that is associated with the receiver 70. In the keyless entry system, the keyless entry system memory 76 stores one ID code.

The keyless entry system control section 73, which serves as the verifying section and the acquiring section, verifies the ID code of the transmitter 61 against the ID code stored in the keyless entry system memory 76. If the ID code of the transmitter 61 that has transmitted the transmission data matches the ID code stored in the keyless entry system memory 76, the keyless entry system control section 73 transmits the door data acquired from the transmission data to the vehicle control device 74. The vehicle control device 74 grasps the request from the transmitter 61 from the door data. Upon reception of the lock command, the vehicle control device 74 controls the door lock device 75 to lock the doors. Upon reception of the unlock command, the vehicle control device 74 controls the door lock device 75 to unlock the doors. Upon reception of the door opening command, the vehicle control device 74 controls a non-illustrated door opening mechanism to open the sliding doors.

The process performed by the keyless entry system control section 73 to verify the ID code of the transmitter 61 against the ID code stored in the keyless entry system memory 76 is the same as the process performed by the receiver control section 41 described in the first embodiment. If the reception circuit 72 receives the first data, the keyless entry system control section 73 verifies the ID code contained in the first data against the ID code stored in the keyless entry system memory 76. If the reception circuit 72 receives the second data, the keyless entry system control section 73 computes the error detection code in the same manner as the transmitter 61 and verifies the ID code depending on whether the error detection code contained in the second data matches the error detection code computed by the keyless entry system control section 73.

Therefore, the fifth embodiment achieves the following advantage.

(15) The transmitter 61 used in the vehicle communication system 60 also extends the life of the battery 30 like the transmitters 21 used in the tire condition monitoring system 20.

The above-described embodiments may be modified as follows.

In the second embodiment, the rule set by the shuffling pattern, that is, how the ID code is to be shuffled may be changed as required. For example, instead of swapping the upper 4 bits with the lower 4 bits in ID1 to ID4, each bit of ID1 to ID4 may be shifted to the upper bit or to the lower bit. The number of bits to be shifted may be set to any number. Alternatively, 0 and 1 of ID1 to ID4, which are represented by the binary numbers, may be reversed. The above-described rules may be combined to shuffle the ID codes.

It may be set such that if each bit of the shuffling pattern is 1, the corresponding one of ID1 to ID4 is not shuffled, and that if each bit of the shuffling pattern is 0, the corresponding one of ID1 to ID4 is shuffled. In the receiver 40, any rule may be set as long as the ID code is shuffled with the same rule as the transmitter 21. That is, it is only required that the rule (program) of the shuffling pattern stored in the transmitter memory 25b is the same as the rule (program) of the shuffling pattern stored in the receiver memory 41b.

In the second embodiment, the first data may be the data containing the preamble, the identifying code, the ID code, the pressure data, the temperature data, the status code, the error detection code, and the stop bit. That is, the transmission data that excludes the shuffling pattern may be the first data. In this case, the ID code is the ID code that has not been shuffled in accordance with the shuffling pattern. Also, the error detection code of the first data is computed from the ID code that has not been shuffled, the pressure data, the temperature data, and the status code.

In the second embodiment, the shuffling pattern may be the data for shuffling data including those other than the ID code.

In the third embodiment, after the first state is switched to the second state, the transmitter control section 25 may be maintained in the second state regardless of whether the detection value exceeds or falls below the threshold value. In this case, the transmitter control section 25 is maintained in the second state if the pressure becomes greater than or equal to the threshold value after the manufacture of the transmitter 21, if the acceleration becomes greater than or equal to the threshold value after the manufacture of the transmitter 21, if the temperature becomes less than or equal to the threshold value after the manufacture of the transmitter 21, or if the voltage becomes less than or equal to the threshold value after the manufacture of the transmitter 21. The transmitter 21 is only required to be in the first state at least at the factory where the transmitter 21 is mounted on the wheel assembly 11. If the above-described condition is satisfied, the transmitter 21 is in the state already mounted on the wheel assembly 11. Thus, once the first state is switched to the second state, it is unnecessary that the second state be able to be switched to the first state.

In the fourth embodiment, a receiver that does not verify the ID code when the second data is acquired, that is, a receiver that is only capable of communicating using the first data may be used as the receiver 40. If the receiver reception circuit 42 receives the second data, the receiver control section 41 judges that the second data is not intended to be transmitted to itself and judges that it is non-authorized data without verifying the ID code. If the first data is acquired, the receiver control section 41 verifies the ID code. The transmitter 21 of the fourth embodiment periodically transmits both the first data and the second data. Thus, a receiver that communicates using the first data can be used as the receiver 40.

In the fourth embodiment, the transmitter control section 25 may transmit the first data more frequently than the second data.

In the first to fourth embodiments, an indicator that indicates the condition of the tires 13 may be connected to the receiver 40.

In the first to fourth embodiments, it is only required that at least one detecting section is provided.

In the first to fourth embodiments, the transmitter control section 25 may be switched to the first state if changes in the pressure per unit time or changes in the temperature per unit time are greater than or equal to a threshold value. The threshold value may be set to a threshold value that can detect the abrupt change in the pressure or the temperature in the tire 13.

In the first to fourth embodiments, the second data may be treated as authorized data if multiple error detection codes contained in the second data match multiple error detection codes computed by the receiver control section 41.

In the first to fourth embodiments, the first data may be transmitted from each transmitter 21 if the trigger data that requests transmission of the first data is transmitted from the trigger device 50.

In the first to fourth embodiments, the second data may be transmitted from the transmitter 21 if the trigger data that requests transmission of the second data is transmitted from the trigger device 50. In this case, the transmitter 21 transmits the first data until the trigger data that requests transmission of the second data is transmitted. The first data may be transmitted from the transmitter 21 if the trigger data that requests transmission of the first data is transmitted from the trigger device 50. In this case, the transmitter 21 transmits the second data until the trigger data that requests transmission of the first data is transmitted.

In the first to fourth embodiments, the trigger signal and the radio signal may be a signal in any frequency band such as a 2.4 GHz band signal.

In the first to fourth embodiments, the receiver memory 41b may store the ID codes the number of which is greater than the number of the wheel assemblies 11 mounted on the vehicle 10. For example, the receiver memory 41b may store the ID codes of the transmitters 21 mounted on the wheel assemblies 11 and the ID code of the transmitter 21 mounted on a spare tire. The receiver memory 41b may store both the ID codes of the transmitters 21 mounted on summer tires and the ID codes of the transmitters 21 mounted on winter tires. In this case, the receiver control section 41 may inform an abnormality of the tires 13 corresponding to the ID codes of up to four wheel assemblies that are frequently received.

In each of the embodiments, the vehicle may be any vehicle that includes multiple wheels, for example, two-wheeled vehicles.

In each of the embodiments, a code other than the error detection code may be used as the computation data. For example, the exclusive OR data may be the computation data. The exclusive OR data is an exclusive OR of at least one of ID1 to ID4, which are pieces of data obtained by dividing the ID code, and at least one of pieces of variable data. That is, the computation data computed from the fixed data and variable data may refer to the data computed from part of the fixed data and part of the variable data or may refer to the data computed from all of the fixed data and all of the variable data.

Since ID1 to ID4 are stored in the receiver memory 41b, the receiver control section 41 computes the exclusive OR data from at least one of ID1 to ID4 stored in the receiver memory 41b and at least one of the pieces of variable data contained in the second data. In this case, the receiver 40 and the transmitters 21 associated with the receiver 40 compute the exclusive OR from the same data. More specifically, the transmitter memory 25b and the receiver memory 41b store the program that computes the exclusive OR data using the same data. In this case, the error detection code is computed from the data including the exclusive OR data.

In a case in which the above-described exclusive OR data is used as the computation data, the second data may, but does not necessarily have to, include the error detection code.

If the second data includes both the exclusive OR data and the error detection code, both the exclusive OR data and the error detection code may serve as the computation data (verification data). More specifically, the transmitter control section 25 generates the second data that includes the exclusive OR data and the error detection code and that does not include the ID code. Upon acquisition of the second data, the receiver control section 41 computes the exclusive OR data and the error detection code from the variable data contained in the second data and the ID code stored in the receiver memory 41b. If the exclusive OR data contained in the second data matches the computed exclusive OR data, and the error detection code contained in the second data matches the computed error detection code, the receiver control section 41 determines that the second data is authorized data. Since the ID code is verified when both the exclusive OR data and the error detection code match, the probability that non-authorized data is erroneously determined as authorized data is decreased compared with a case in which either the error detection code or the exclusive OR data is used as the verification data. In a case in which both the exclusive OR data and the error detection code are used as the computation data (verification data), it is only required that the total data length of the exclusive OR data and the error detection code is shorter than the data length of the fixed data.

Instead of the exclusive OR data, data computed by a given method from at least one of ID1 to ID4, which are the pieces of data obtained by dividing the ID code, and at least one of the pieces of variable data may be used as the computation data. As long as the transmitter control section 25 and the receiver control section 41 perform the computation by the same method, any computation method may be able to verify the ID code. Thus, as long as the same computation is performed in the transmitter 21 and the receiver 40 that are associated with each other, the computation method may be changed.

In each of the embodiments, the transmitter 21, 61 may be capable of transmitting only the second data. The transmitter control section 25 and the key control section 64 always generate the second data when transmitting the transmission data. In this case, the registration of the ID code to the transmitter 21, 61 (storage of the ID code in the transmitter memory 25b and the key memory 67) is performed by reading a QR code (registered trademark) or a barcode, writing with a device connected to the transmitter 21, 61 with a wire, or voice recognition.

In each of the embodiments, the receiver 40, 70 does not necessarily have to verify the ID code upon acquisition of the first data, but may verify the ID code upon acquisition of the second data. The receiver control section 41 and the keyless entry system control section 73 judge whether the transmission data is the second data based on the data length and the identifying code. Even if the transmission data other than the second data (first data) is acquired, the receiver control section 41 and the keyless entry system control section 73 judge that the transmission data is non-authorized data without performing processes such as verification of the ID code and registration of the ID code. Upon acquisition of the second data, the receiver control section 41 and the keyless entry system control section 73 verify the ID code by the control that is the same as the control in the embodiments. In this case, the registration of the ID code to the receiver 40, 70 (storage of the ID code in the receiver memory) is performed by reading a QR code or a barcode, writing with a device connected to the receiver 40, 70 with a wire, or voice recognition.

In the first to fourth embodiments, upon acquisition of the first data, the receiver control section 41 verifies the ID code contained in the first data against the ID code stored in the receiver memory 41b. If the ID code that is not stored in the receiver memory 41b is acquired, the ID code may be stored in the receiver memory 41b. In this case, the receiver control section 41 may store the ID code in the receiver memory 41b upon first acquisition of the ID code or may store the ID code in the receiver memory 41b if the same ID code is acquired multiple times consecutively. If the ID code is registered at the first acquisition, the ID code contained in the first data that is accidentally received may possibly be stored in the receiver memory 41b. An ID code is prevented from being erroneously stored in the receiver memory 41b by storing the ID code in the receiver memory 41b if the same ID code is acquired multiple times consecutively. With this configuration, if the fixed data is acquired, the receiver memory 41b stores the ID code. Thus, the fixed data is automatically registered in the receiver memory 41b. The receiver control section 41 functions as a registering section, which stores the ID code contained in the second data in the receiver memory 41b. The registering section (registering means) is implemented as the function of the receiver control section 41.

In the first to fourth embodiments, when the receiver 40 acquires the first data, the ID code contained in the first data may be stored in the receiver memory 41b. That is, if the receiver control section 41 acquires the first data, the receiver control section 41 may register the ID code to the receiver memory 41b without verifying the ID code contained in the first data against the ID code stored in the receiver memory 41b. In this case, the receiver control section 41 may store the ID code in the receiver memory 41b by the first acquisition or may store the ID code in the receiver memory 41b if the same ID code is acquired multiple times consecutively. Thus, if the fixed data is acquired, the ID code is stored in the receiver memory 41b. Thus, the fixed data is automatically registered in the receiver memory 41b. In this case also, the receiver control section 41 functions as the registering section.

In each of the embodiments, the state of the transmitter control section 25 (the keyless entry system control section 73) may be set to any of the three states including the state in which only the first data is transmitted (first state), the state in which only the second data is transmitted (second state), and the state in which the first state and the second state are switched. The state of the transmitter control section 25 (the keyless entry system control section 73) may be manually set by a switch provided on the transmitter 21, 61. Alternatively, the state of the transmitter control section 25 (the keyless entry system control section 73) may be set by a device (for example, the trigger device 50) connected to the transmitter 21, 61 with a wire or wirelessly. In this case, the transmission manner of the transmitter 21, 61 may be changed depending on the receiver 40, 70 mounted on the vehicle 10. For example, in the case with the receiver 40, 70 that communicates (performs verification) using the first data, the transmitter control section 25 (the keyless entry system control section 73) is set to the first state, in which only the first data is transmitted. In the case with the receiver 40, 70 that communicates (performs verification) using the second data, the transmitter control section 25 (the keyless entry system control section 73) is set to the second state in which only the second data is transmitted. In the case with the receiver 40, 70 (the receiver of each embodiment) that communicates (performs verification) using both the first data and the second data, the transmitter control section 25 (the keyless entry system control section 73) is set to the state in which the first state and the second state are switched. If the state of the transmitter control section 25 (the keyless entry system control section 73) is set to the state in which the first state and the second state are switched, the first state and the second state are switched in the manner described in each embodiment.

In each of the embodiments, the receiver 40, 70 may be set to any of the state in which the ID code is verified only when the first data is acquired, the state in which the ID code is verified only when the second data is acquired, and the state in which the ID code is verified in either the case in which the first data is received or the case in which the second data is received. That is, it may be set whether to assume either the first data or the second data to be authorized data or to assume both the first data and the second data to be authorized data. The state of the receiver 40, 70 may be manually set by a switch provided on the receiver 40, 70. Alternatively, the state of the receiver 40, 70 may be set by a device that is connected to the receiver 40, 70 with a wire or wirelessly. In this case, the receiving manner of the receiver 40, 70 may be changed in accordance with the transmitter 21, 61 associated with the receiver 40, 70. For example, in a case in which the transmitter 21, 61 that transmits the first data is used, the receiver 40, 70 is set to the state that verifies the ID code when the first data is acquired. In a case in which the transmitter 21, 61 that transmits the second data is used, the receiver 40, 70 is set to the state that verifies the ID code when the second data is acquired. In a case in which the transmitter 21, 61 that transmits the first data and the second data is used, the receiver 40, 70 is set to the state that verifies the ID code in either the case in which the first data is received or the case in which the second data is received.

In each of the embodiments, the transmitter 21, 61 may be capable of transmitting only the first data. The receiver 40, 70 of each embodiment verifies the ID code in either the case in which the first data is received or the case in which the second data is received. Thus, even in a case in which the transmitter 21, 61 that is capable of transmitting only the first data is used as the transmitter 21, 61, it is possible to transmit and receive data between the transmitter 21, 61 and the receiver 40, 70.

In each of the embodiments, the number of bits (data length) of the error detection code may be changed as required as long as it is less than the number of bits (data length) of the ID code. For example, the error detection code may be 16 bits.

The transmitter and the receiver may be used in systems other than the tire condition monitoring system 20 and the vehicle communication system 60. For example, in a case in which sensor units provided in opening and closing members, such as doors, a trunk, a hood, and power windows, are wirelessly connected to a vehicle control device (a vehicle ECU) mounted on a vehicle, each sensor unit has an ID code. Each sensor unit includes a sensor for detecting the state of the opening and closing member and a transmission circuit that transmits data containing the detection result. The vehicle control device recognizes from which of the sensor units the data has been transmitted based on the ID code. In this case also, the transmission and the reception of data using the first data and the second data are possible. Alternatively, the first data and the second data may be transmitted from the vehicle control device as the transmission data that gives a command (such as a drive command) to a control section that controls an actuator mounted on the vehicle.

The first data and the second data may be used for the transmission and the reception of data between a wireless device, such as a wireless mouse and a wireless keyboard, and a terminal, such as a portable terminal and a personal computer. The first data and the second data may be used for the transmission and the reception of data between a network device and a residential device, such as a residential power consumption sensor, a fire alarm, a building distortion sensor, an air-conditioner, and a residential crime prevention sensor. The first data and the second data may be used for the transmission and the reception of data between a wearable device, such as a pedometer, a heart rate meter, a blood pressure meter, and smart glasses, and a terminal, such as a portable terminal and a personal computer. The first data and the second data may be used for the transmission and the reception of data between sports equipment, such as a bat and a golf club with a built-in acceleration sensor, and a terminal, such as a portable terminal and a personal computer.

In each of the embodiments, the first data and the second data may have different values for the preamble and the stop bit. In this case, the receiver control section 41 may distinguish whether the transmission data is the first data or the second data based on the preamble and the stop bit.

In each of the embodiments, the data generating section and the control section, which switches the data generating section between the first state and the second state, may be separate members. That is, the transmitter 21, 61 may include a device that functions as the data generating section (microcomputer) and a device that functions as the control section (microcomputer) separately.

In each of the embodiments, the data contained in the transmission data may be changed as required. For example, in the first to fourth embodiments, the transmission data may contain the acceleration data detected by the acceleration sensor 24.

The invention claimed is:

1. A transmitter for transmitting transmission data to a receiver, the transmitter comprising:
   a power source;
   a transmitter memory, which stores identification information;
   a data generating section, which generates the transmission data containing variable data that may have a different value and verification data, which causes a verifying section provided in the receiver to verify the identification information stored in the transmitter memory against the identification information registered in the receiver,
   wherein the transmission data contains a shuffling pattern for shuffling an ID code, which indicates the identification information of the transmitter, and
   wherein the data generating section is capable of generating, as the verification data, computation data that is computed from fixed data representing the identification information stored in the transmitter memory and the variable data and that has a shorter data length than the fixed data.

2. The transmitter according to claim 1, wherein the computation data is an error detection code or an error correction code.

3. The transmitter according to claim 1, further comprising a detecting section, which detects a tire condition,
   wherein the data generating section generates the variable data that represents the tire condition detected by the detecting section.

4. The transmitter according to claim 1, further comprising a control section, which is capable of switching the data generating section between a first state, in which the verification data is the fixed data, and a second state, in which the verification data is the computation data.

5. The transmitter according to claim 4, wherein the control section counts the number of times a process has been performed from a predetermined point in time when counting is started, and the control section switches the first state to the second state if the number of times the process has been performed becomes greater than or equal to a process threshold value.

6. The transmitter according to claim 4, further comprising a detecting section, which detects a tire condition,
   wherein the control section switches between the first state and the second state based on whether a detection value detected by the detecting section is greater than or equal to a threshold value.

7. The transmitter according to claim 4, further comprising a detecting section, which detects a tire condition,
   wherein the control section switches the first state to the second state based on whether a detection value detected by the detecting section is greater than or equal to a threshold value and maintains the second state from then on regardless of the detection value.

8. A receiver for receiving transmission data transmitted from a transmitter, the receiver comprising:
   a receiving section, which receives the transmission data;
   an acquiring section, which acquires, from the transmission data received by the receiving section, verification data contained in the transmission data and variable data that may have a different value;
   a receiver memory, which stores identification information; and a verifying section, which verifies the identification information registered in the transmitter that has transmitted the transmission data against the identification information stored in the receiver memory based on the verification data and data representing the identification information stored in the receiver memory, wherein the transmission data contains a shuffling pattern for shuffling an ID code, which indicates the identification information of the transmitter, and wherein if the acquiring section acquires, as the verification data, computation data that is computed from the fixed data representing the identification information registered in the transmitter and the variable data and that has a shorter data length than the fixed data, the verifying section checks whether the computation data matches the data computed from the variable data and the data representing the identification information stored in the receiver memory so as to verify the identification information registered in the transmitter against the identification information registered in the receiver.

9. The receiver according to claim 8, wherein, if the acquiring section acquires the fixed data as the verification data, the verifying section checks whether the fixed data matches the data representing the identification information stored in the receiver memory so as to verify the identification information registered in the transmitter against the identification information registered in the receiver.

10. The receiver according to claim 8, further comprising a registering section, which stores the fixed data in the receiver memory, wherein if the acquiring section acquired the fixed data as the verification data, the registering section stores the fixed data in the receiver memory.

11. The receiver according to claim 8, wherein the transmitter is mounted on each of a plurality of wheels of a vehicle, detects a tire condition and transmits the transmission data containing the variable data representing the detected tire condition, the receiver memory stores identification information registered to each of the transmitters mounted on the wheels, and the verifying section verifies the identification information registered in the transmitter against the identification information stored in the receiver memory based on the verification data and each piece of identification information stored in the receiver memory.

12. A transmitting and receiving system that includes a transmitter, which transmits transmission data, and a receiver, which receives the transmission data transmitted from the transmitter, wherein the transmitter includes
    a power source,
    a transmitter memory, which stores identification information, and
    a data generating section, which generates the transmission data containing variable data that may have a different value and verification data, which is used for verifying the identification information stored in the transmitter memory against the identification information registered in the receiver,
wherein the transmission data contains a shuffling pattern for shuffling an ID code, which indicates the identification information of the transmitter, and
wherein the data generating section is capable of generating, as the verification data, computation data that is computed from fixed data representing the identification information stored in the transmitter memory and the variable data and that has a shorter data length than the fixed data, the receiver includes
    a receiving section, which receives the transmission data,
    an acquiring section, which acquires the verification data and the variable data from the transmission data received by the receiving section,
    a receiver memory, which stores identification information, and
    a verifying section, which verifies the identification information registered in the transmitter that has transmitted the transmission data against the identification information stored in the receiver memory based on the verification data and data representing the identification information stored in the receiver memory, and
if the acquiring section acquires the computation data as the verification data, the transmitting and receiving system checks whether the computation data matches data computed from the variable data and data representing the identification information stored in the receiver memory so as to verify the identification information registered in the transmitter against the identification information registered in the receiver.

* * * * *